US006874062B1

(12) United States Patent
Goldberg

(10) Patent No.: US 6,874,062 B1
(45) Date of Patent: Mar. 29, 2005

(54) SYSTEM AND METHOD FOR UTILIZING A HIERARCHICAL BITMAP STRUCTURE FOR LOCATING A SET OF CONTIGUOUS ORDERED SEARCH ITEMS HAVING A COMMON ATTRIBUTE

(75) Inventor: Richard A. Goldberg, Richmond, VA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/510,426

(22) Filed: Feb. 22, 2000

(51) Int. Cl.[7] .............................................. G06F 12/00
(52) U.S. Cl. ............................ 711/117; 707/3; 711/173
(58) Field of Search ................................ 711/170, 156, 711/202, 221, 117, 173; 707/100, 3, 2, 1, 200, 205

(56) References Cited

U.S. PATENT DOCUMENTS

| | | | | |
|---|---|---|---|---|
| 5,713,002 A | * | 1/1998 | Zbikowski et al. | 711/112 |
| 5,802,599 A | * | 9/1998 | Cabrera et al. | 711/170 |
| 5,829,004 A | * | 10/1998 | Au | 707/100 |
| 5,873,118 A | * | 2/1999 | Letwin | 707/205 |
| 6,115,716 A | * | 9/2000 | Tikkanen et al. | 707/100 |
| 6,175,900 B1 | * | 1/2001 | Forin et al. | 139/193 |
| 6,185,663 B1 | * | 2/2001 | Burke | 711/156 |
| 6,453,403 B1 | * | 9/2002 | Czajkowski | 707/200 |
| 6,510,505 B1 | * | 1/2003 | Burns et al. | 711/170 |
| 6,560,610 B1 | * | 5/2003 | Eatherton et al. | 707/104.1 |

* cited by examiner

*Primary Examiner*—Jean R. Homere
*Assistant Examiner*—Leslie Wong
(74) *Attorney, Agent, or Firm*—Beth L. McMahon; Charles A. Johnson; Mark T. Starr

(57) ABSTRACT

A system and method is provided for locating, within a set of ordered items, N contiguous items having a desired attribute. The system utilizes a hierarchical bitmap structure. At the lowest level, a bitmap is provided, wherein each bit in the bitmap corresponds to a respective search item. The bit has a state indicative of a state of the search item. This lowest level bitmap is divided into segments. A higher-level bitmap is created, with each bit in this higher-level bitmap being associated with one of the segments and being assigned a state that describes a collective state of the search items associated with the segment. The higher-level bitmap may be sub-divided and the process repeated to create a hierarchical bitmap structure having any number of levels. The bitmap structure may be recursively searched to locate N contiguous ordered search items having a desired attribute.

28 Claims, 16 Drawing Sheets

SYSTEM AND METHOD FOR UTILIZING A HIERARCHICAL BITMAP STRUCTURE FOR LOCATING A SET OF CONTIGUOUS ORDERED SEARCH ITEMS HAVING A COMMON ATTRIBUTE

FIELD OF THE INVENTION

This invention relates to an improved system and method for cataloging attributes assigned to an ordered group of searchable items; and more specifically, relates to an improved system and method that may be adapted for cataloging, locating, and allocating a set of N contiguous available storage sections of a storage facility within a data processing system.

DESCRIPTION OF THE PRIOR ART

Data processing systems typically include a finite amount of storage space. This storage space may be provided by a main memory comprised of Random Access Memory (RAM) devices. Data processing systems also generally include mass storage facilities provided, for example, by disk arrays.

The storage facilities within a data processing system must be managed so that appropriate space may be allocated in response to requests for such resources. For example, application programs may make requests for the allocation of temporary buffer space within the main memory. This buffer space may be needed as a scratch pad during program execution. Alternatively, the buffer space may be necessary to store data that is generated by the executing application. Such data may be stored in the main memory temporarily until it may be written to a mass storage facility, or may remain located in the memory on a more permanent basis.

Often, the memory allocation function is performed by an Operating System (OS). Application programs running under the control of the OS make requests to the OS for a portion of storage of a predetermined length. The OS locates the requested storage from the pool of system resources and assigns this storage space to the requesting application. When the application no longer requires the use of the storage space, it may be returned to the OS to be added back into the pool of available resources.

Sometime, the application programs themselves may also perform some of the memory allocation functions for the system. For example, the OS may provide an application with a block of available memory. The application controls the manner in which this block is allocated for use by the various tasks associated with the application.

Many mechanisms have been used to provide for the allocation of storage resources within a data processing system. According to one mechanism, a pool of buffers is created. Generally, all buffers in the pool will be the same size. This pool may be managed using many types of data structures. For example, the buffer addresses may be recorded using a linked list. When a request for storage is issued, the first address in the linked list may be provided to the requester. The address may then be removed from the linked list of available buffers and entered onto a different linked list of addresses associated with allocated resources, for instance. When the buffer is no longer required for use by the application, the buffer address is again moved to the list of available resources.

Use of the foregoing buffer pool approach provides a straight-forward mechanism for allocating storage. Assuming that a requested buffer is available for allocation, the storage may be performed with minimal delay. However, this approach may result in inefficient use of the storage space. This is because each buffer is generally of a same predetermined length. The buffer length is likely selected to satisfy the maximum memory requirement of the system. Requests associated with smaller storage requirements are satisfied using the standard-sized buffer. This results in wasted storage space, which may cause storage shortages in some systems.

An alternative approach to memory allocation addresses the above-mentioned problem by creating multiple buffer pools. Each pool provides a buffer of a different size. For example, a first pool may be associated with buffers that are each approximately 1000 bytes (1 Kbytes) in length, whereas a second pool may be associated with buffers that are each 1 million bytes (1 Mbytes) in length. Intermediate-sized buffers may also be provided by one or more additional buffer pools. A request for storage space is satisfied using the smallest buffer that is available and that can accommodate the request. If a buffer of the optimal size is not available to fulfill a request because a buffer pool has been depleted, a larger buffer from a different pool may be divided to create multiple smaller buffers which are then used to populate the depleted pool.

The use of multiple buffer pools allows storage resources to be allocated in a manner that conserves system resources. However, depending on the number of pools created within the system, more memory may still be allocated than is necessary. In the foregoing example in which buffers are only available in 1-Kbyte and 1-Mbyte sizes, a request for a buffer of 500 Kbytes must be satisfied using a 1 Mbyte buffer, which results in a considerable waste of storage space.

Another disadvantage associated with the foregoing buffer pool mechanisms involves the amount of storage space consumed by the data structures such as linked lists that are required to implement the buffer pools. Each entry in a linked list must include both an address pointer to the associated buffer, and must also contain at least one address pointer to another entry in the list. If the list is a doubly-linked list, two such address pointers to the linked entries are needed. Therefore, as the number of buffers in the data pool increases, the size of the linked list becomes prohibitive.

Another method for tracking and allocating available memory that is not associated with the above-described disadvantages involves the use of bitmaps. As is known in the art, a bitmap is a sequence of bits wherein each bit in the sequence is associated with a data item, a system resource, or whatever other type of entity is being described by this data structure. Generally, the bitmap is ordered, meaning the bits in the bitmap are arranged in a sequence indicative of the order in which the items being described are arranged. The state of a bit in the bitmap is indicative of an attribute that is associated with the data item being described.

A bitmap may be used to describe the availability of units of storage. In this case, a storage facility (or a portion thereof) is divided into sections that are all of the same predetermined length. Each bit in the bitmap is associated with a different respective one of the sections. The arrangement of the bits in the bitmap reflects the order of the sections within the storage facility. A bit may be set to a predetermined state to indicate whether or not the respectively associated storage section is available for allocation.

The use of a bitmap allows the size of an allocated buffer to closely approximate the size of the request. If smaller sections of storage space are utilized (for example, sections that are 1 K or 10 K bytes in length), wasted storage space is minimized. A contiguous number of available sections are allocated for those requests that require a buffer larger than a single section. Additionally, since only a single bit is required to describe whether each section of storage is allocated, a much smaller amount of memory is associated with the use of bitmaps as compared to the use of linked lists. The use of bitmaps in allocating storage resources allows requests to be satisfied with buffers that are sized more accurately to match a specific requirement. However, as a storage facility is divided into smaller sections, the bitmap size increases. For example, consider a portion of a storage facility that has been divided into sixteen million sections. The corresponding bitmap contains sixteen million (roughly $2^{24}$) bits. Stated differently, the bitmap consumes roughly 2 Mbytes of memory. Performing a bit-by-bit search on this data structure to locate a contiguous number of N available sections can be time-consuming.

What is needed, therefore, is an improved system and method of tracking and cataloging the attributes associated with a set of ordered search items. This system and method allows a set of N contiguous items having a predetermined attribute to be located more efficiently than can be accomplished by performing a bit-by-bit search using a conventional bitmap structure. Such a method may be adapted for use in cataloging and allocating contiguous sections of available storage space as provided by a storage facility of a data processing system.

OBJECTS

It is the primary object of the invention to provide an improved system and method for cataloging attributes associated with a set of ordered items being cataloged;

It is a further object to provide a hierarchical data structure adapted for use in locating a contiguous set of N items wherein every item in the set is associated with a predetermined attribute;

It is a further object of the invention to provide a system and method for locating available storage resources within a data processing system in a more efficient manner;

It is another object to provide a storage allocation system that utilizes a hierarchical data structure to record the availability of memory sections;

It is another object to provide a method of searching a hierarchical data structure describing storage availability within a data processing system in a manner that allows sections of the data structure indicative of allocated memory to be skipped;

It is yet another object to provide a method of storage allocation that provides enhanced performance in systems wherein a large percentage of memory is generally in use at any given point in time; and It is a further object to provide an improved system and method for allocating storage in a more efficient manner in those systems that utilize a search that starts from a predetermined boundary of the storage address range.

Other more detailed objectives will become apparent from a consideration of the Drawings and the Detailed Description of the Preferred Embodiment.

SUMMARY OF THE INVENTION

The current invention provides an improved system and method for locating, within a group of ordered search items, a set of N contiguous ones of the items each having a desired attribute. This system and method is readily adapted for use in allocating contiguous sections of storage space within a data processing facility.

The system utilizes a hierarchical bitmap structure that includes multiple hierarchical BitMap Levels (BMLs). The Lowest-Level BML in the structure, also referred to as the LLB, is a bitmap wherein each bit corresponds to a different respective one of the search items, and the order of the bits is indicative of the order of the search items. Each bit is set to a state indicative of whether or not the respective one of the search items has been associated with a predetermined attribute. For example, when the LLB is adapted for use in a memory allocation system, each bit in the LLB corresponds to a different respective section of a storage facility. The arrangement of the bits within the LLB corresponds to the order the sections appear within the storage facility. Each bit is set to a predetermined state indicative of whether the respective section is available for allocation.

The LLB is divided into Segments, wherein each of the Segments includes multiple bits. In a first embodiment, each of the Segments has approximately the same number of bits as the other Segments, although the Segments need not be of equal length. A first hierarchical BML is defined to describe the Segments of the LLB. This first hierarchical BML is a bitmap wherein each of the included bits is associated with a different respective one of the Segments of the LLB. The arrangement of the bits in the BML corresponds to the LLB Segment order. A bit within the first BML is set to a predetermined state based on the collective states of the bits in the LLB. For example, a bit in the first BML may be cleared if any of the bits in the corresponding Segment is cleared. This may correspond to the situation in which at least one of the search items associated with the Segment is assigned the desired attribute.

The definition process is repeated for additional levels of hierarchy. For example, the first hierarchical BML is divided into Segments. A second BML is defined in the manner discussed above to describe the Segments of the first BML. That is, each bit in the second BML corresponds to a different respective one of the Segments of the first BML, and is set to a state indicative of the collective states of the bits in the respective Segment. This process may be repeated for any number of hierarchical levels in the hierarchical bitmap structure.

The above description can be further illustrated by returning to the current example. When adapted for use in a memory allocation system, each bit in the LLB corresponds to a section of storage. A bit may be set to a predetermined state, for example "0", to indicate that the corresponding memory section is available for allocation. A first BML is then defined to describe this LLB. In one embodiment, a bit in the first BML is cleared to indicate memory availability if any of the bits in the corresponding Segment of the LLB is cleared, indicating memory availability. The other BML levels are defined in a similar manner.

The hierarchical structure may be used to efficiently locate any string of N contiguous items having the desired attribute. Returning again to the current example, assume that a storage buffer including four storage sections is required. A search may be performed on the hierarchical bitmap structure starting at one edge of the LLB. The search continues until four contiguous bits set to the predetermined state (that is, "0" in this example) are located. When the end of a Segment of the LLB is reached, the search proceeds to the next higher BML in the data structure. The search begins at this higher level with the bit within the higher-level bitmap that corresponds to the next LLB Segment that is to be searched. The search continues at this higher level until a bit is located indicating that at least one of the bits in the associated Segment is in the predetermined state indicating memory availability, or until the end of a Segment is reached. In the former case, the search proceeds to the respectively associated Segment at the next lower level in the bitmap to being a bit-by-bit search of this Segment. In the latter case, the search proceeds to the next higher level to be continued in the manner discussed above. In this manner, the bitmap is traversed efficiently by skipping any Segments wherein each bit in the Segment indicates that all associated data items do not have the desired search attribute.

A search is terminated if an edge of any BML is reached without locating the desired contiguous search items. In this case, the string of items is not available. Otherwise, the items are located, and the respectively associated bits in the LLB and in other BMLs must be set to a different state, if appropriate, to reflect a change of the attributes associated with the located search items. For example, if used in a memory allocation system, the bits in the LLB are set to a predetermined state to indicate the allocation of the corresponding memory sections. Similarly, bits within other BMLs may also have to be set to a different predetermined state as a result of the changes made to the LLB.

The foregoing example describes one method of using the hierarchical bitmap structure to locate N contiguous search items having a predetermined attribute. Another method is provided that utilizes a top-down search mechanism that may be better adapted to searches in which N is a relatively large number. According to this mechanism, each of the Segments within a particular BML must be the same size as the other Segments in that BML so that any bit within any BML represents the same number of search items as any other bit within the same BML.

According to the alternative process, the search for N contiguous search items having a predetermined attribute begins at one edge of the highest BML in the hierarchical structure. Within this highest BML, the search attempts to locate the minimum number of contiguous bits "X" required to represent N contiguous search items. For example, assuming a search item corresponds to a 1 Kbyte block of memory, and a buffer of 300 Kbytes is desired. Assume further that one bit in the highest BML represents 200 search items. Therefore, the search begins at the highest level by attempting to locate two contiguous bits representing the minimum 500 Kbytes required to accommodate the request.

When the desired number of bits are located, all bits corresponding to the located bits at the next lower BML in the hierarchy are located. The value "X" is reset to reflect the current BML. Then, within the string of located bits, the process is repeated to locate all combinations of X contiguous bits in the desired state within the current BML. The process is repeated in a recursive manner for all such located bit combinations until the LLB is reached. If the desired number of N contiguous search items having the desired attribute are not located by searching the LLB, X is reset to represent the highest BML. The process is repeated for the next set of X unprocessed bits within the highest BML.

The foregoing hierarchical bitmap structure allows searches for N contiguous items having a desired attribute to be completed more efficiently. This is because the bitmap may be traversed at a higher level in the bitmap hierarchy to skip those lower-level Segments that are not associated with any of the desired search items. The hierarchical bitmap structure is particularly effective in systems wherein, at any given point in time, a substantial percentage of memory is already allocated. The bitmap structure is also particularly adapted for those systems wherein searches for available storage space is always initiated from the same predetermined address boundary of the storage device. In both of these cases, large contiguous blocks of allocated memory may be efficiently skipped by moving to a higher level in the bitmap hierarchy to accomplish the search.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

DETAILED DESCRIPTION OF THE PREFERRED EMBODIMENT

Figure 1:
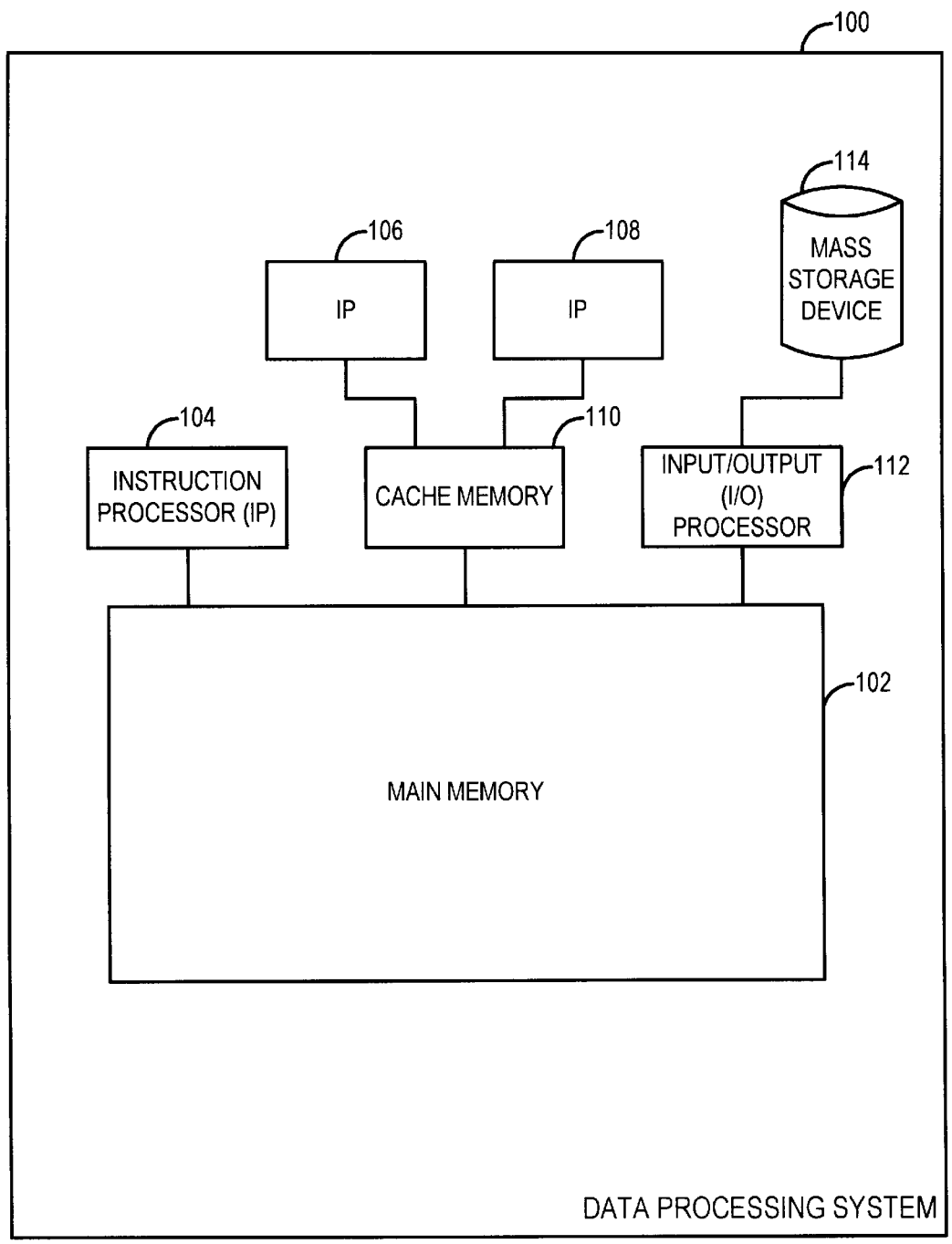
FIG. 1 is a block diagram of an exemplary Data Processing System within which the current invention may operate.

FIG. 1 is a block diagram of an exemplary Data Processing System 100 within which the current invention may operate. This data processing system includes a Memory 102 that may be coupled to one or more Processors and other devices. The Data Process System includes Instruction Processor (IP) 104 coupled directly to Memory 102. IPs 106 and 108 are also shown coupled to Memory 102 via a Cache Memory 110. Memory 102 provides the main storage facility for the data processing system, and is shared by all of the IPs. The Cache Memory 110 provides a smaller, faster, more highly-accessible storage means for LPs 106 and 108 as is known in the art. Memory 102 is also shown coupled to an Input/Output (I/O) Processor 112. This I/O Processor interfaces to one or more peripheral devices such as Mass Storage Device 114, which may be a disk device, in a manner known in the art. Many other types of configurations can be used to support the current invention, and it will be understood that the system of FIG. 1 is exemplary in nature only.

Figure 2:
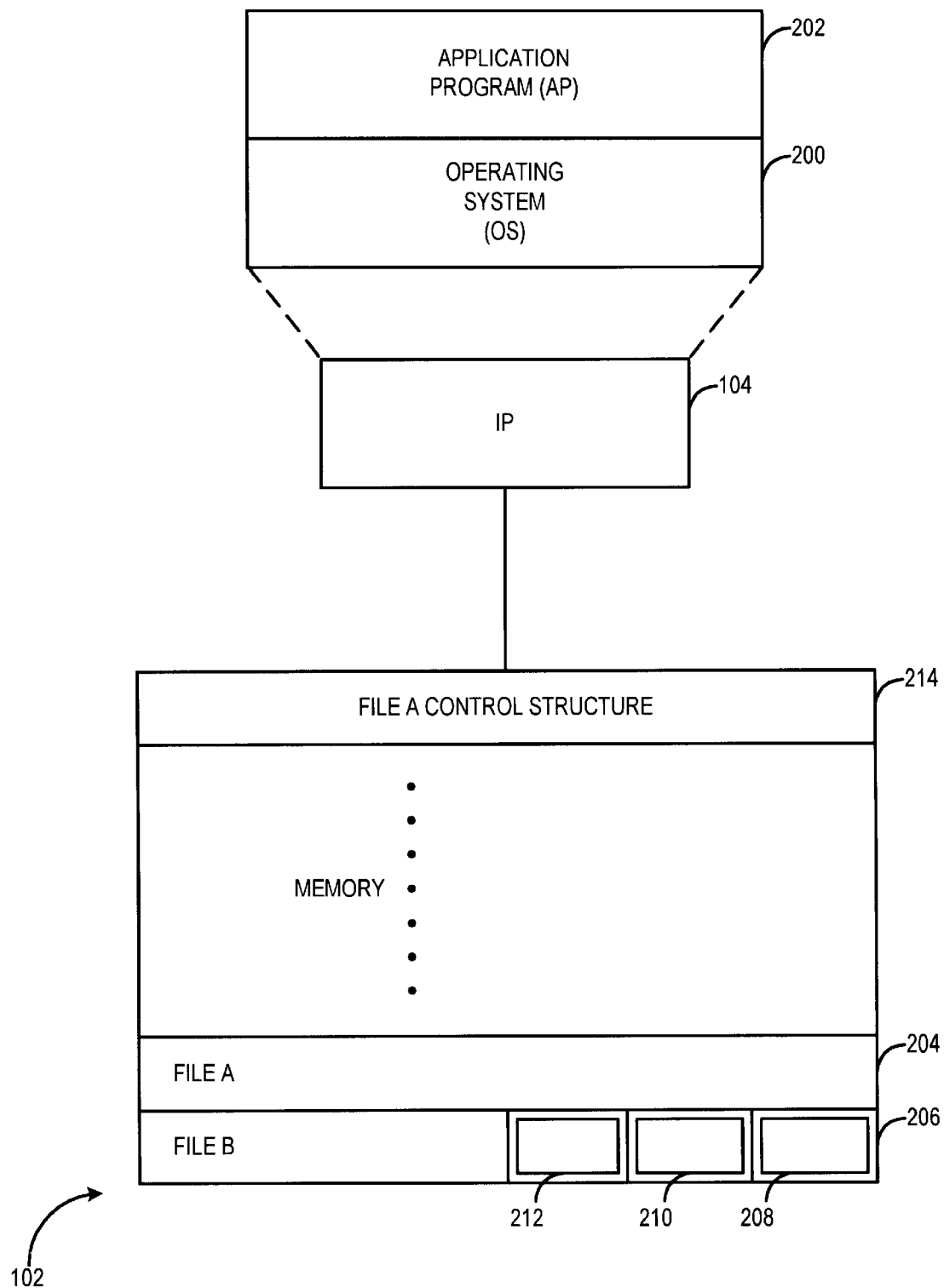
FIG. 2 is a block diagram illustrating a manner in which resources may be allocated within the Data Processing System.

FIG. 2 is a block diagram illustrating a manner in which resources may be allocated within Data Processing System 100. An Operating System (OS) 200 running on IP 104 manages and allocates the various resources of Data Processing System. Application programs such as that shown as Application Program (AP) 202 make requests to the OS to obtain access to system resources. For example AP 202 may request use of a specified portion of Memory 102. In response, OS 200 allocates a predetermined portion of Memory 102 shown as File A 204 that is large enough to fulfill the memory requirements of AP 202. OS 200 records that the portion of Memory shown as File A 204 is allocated to AP 202.

In the system of the preferred embodiment, Files can further be subdivided into smaller addressable portions of memory called memory "sections", wherein each section has a same predetermined size. For example, File B 206 is shown subdivided into Sections 208, 210, 212, and so on.

In the current system, the AP controls the allocation of Sections of a File. Sections are allocated whenever the AP requires buffer space to temporarily store data signals. AP allocates the appropriate number of contiguous memory Sections as are required to meet storage requirements at any given point in time. The Sections that are in use within a particular File will constantly fluctuate during AP execution. This may occur, for example, as Sections are newly allocated, or when data is written from a File to a Mass Storage Device 114, thereby freeing previously-used Sections for re-allocation. AP must record which Sections are in use within a File at any given point in time, so that available File space can be identified for future use.

In the preferred embodiment, AP records the allocation of File space using a bitmap scheme. According to this mechanism, each Section within a file is associated with a corresponding bit of a bitmap. The corresponding bit is set to a first state if the associated Section is available for use, and is set to the other binary state if the Section is already in use. This bitmap may be stored within a designated control area of Memory. For example, File A Control Structure 214 stores the bitmap for File A 204.

Figure 3:
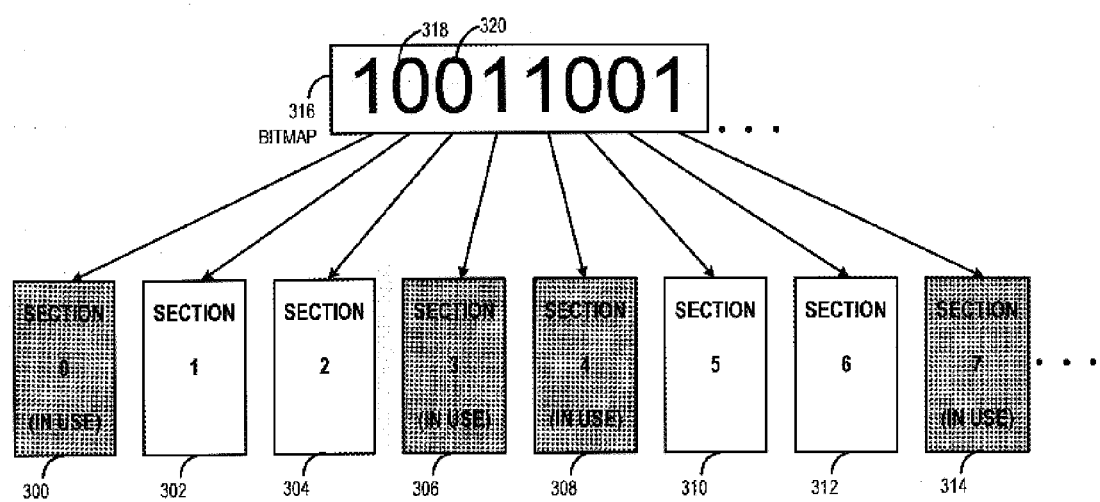
FIG. 3 illustrates the use of a bit map scheme in recording the allocation of Memory Sections.

FIG. 3 illustrates the use of a bitmap scheme in recording the allocation of Memory Sections. Sections 0 through 7 are labeled 300 through 314, respectively. Each of the bits in Bitmap 316 correspond to an associated one of Sections 0 through 7. In the illustrated implementation, a bit is set if the corresponding Section is in use, and is cleared if the Section is available for allocation. This is an arbitrary implementation, and the cleared state could readily be used instead to indicate a Memory Section that is already allocated. It will be noted that the bits within Bitmap 316 are arranged in an order corresponding to the arrangement in Memory of the corresponding Sections.

The use of a bitmap provides a straight-forward means of locating a contiguous area of available memory, as discussed above. A search of a bitmap is initiated at a predetermined edge of the data structure. The bits of the bitmap are searched in order until a predetermined number N contiguous bits are encountered that indicate the desired number of available memory sections. For example, assume AP 202 requires the use of a memory buffer that is larger than a single Section, but smaller than two Sections. AP may begin searching Bitmap 316 from the left edge of the data structure until the two contiguous bits 318 and 320 are encountered. These bits indicate that contiguous memory Sections 1 and 2 (labeled 302 and 304, respectively) may be allocated to satisfy the memory request. If, however, three contiguous Sections are required instead of two, none of the contiguous available portions of Memory 102 represented by FIG. 3 can accommodate the request. The search must continue to another portion of the Bitmap 316 (not shown) until the appropriate buffer space is located.

Although the bitmap implementation shown in FIG. 3 is straight-forward, the time required to perform a bitmap search can become prohibitive as the number of Sections in a File increase. For example, consider a File having sixteen million Sections. The corresponding bitmap contains sixteen million (roughly $2^{24}$) bits. Stated differently, the bitmap consumes roughly two Megabytes of storage space. A bit-by-bit, or even a word-by-word, search of this bitmap storage is time-consuming, thereby degrading the performance of the AP.

The above problem is addressed by the current invention, which provides a hierarchical bitmap structure. According to this system and method, a bitmap structure is defined that allows N contiguous search items to be located wherein all search items in the set have a same predetermined attribute. This system and method may be adapted for use in locating N contiguous sections of memory all having the same predetermined attribute. Namely, the contiguous sections are all available for allocation.

According to the current system, a hierarchical bitmap structure is defined to describe the first bitmap structure. Still another bitmap structure is used to describe the first hierarchical bitmap structure, and so on. At the highest level in the hierarchy, a bitmap data structure is defined that concisely represents the storage allocation patterns existing within an associated File. A recursive search may be used to traverse the various hierarchical levels in the bitmap to efficiently locate areas of contiguous memory that are available for allocation.

In a hierarchical bitmap scheme of the current invention, the Lowest Level Bitmap (LLB) in the hierarchy is the bitmap which has a one-to-one correspondence with Memory Sections. That is, the LLB contains a bit for each Section in a File. Such a bitmap structure is shown as Bitmap 316 of FIG. 3.

The LLB may be divided into Segments. According to one embodiment, these Segments all include a same predetermined number of bits. In a second embodiment, this is not a requirement, as will be discussed further below. A bitmap is then created to define the Segments of the LLB. This bitmap, which may be referred to as Bitmap 1, will include a corresponding bit to describe an associated different one of the Segments of the LLB. A bit will be in a first predetermined state if any of the bits in the corresponding LLB Segment are in the predetermined state indicating the availability of memory. In the current example, a bit in Bitmap 1 is set to "0" if any of the bits in the corresponding LLB Segment are also cleared. A bit in Bitmap 1 will be in the second state if all bits in the corresponding LLB Segment are in a state indicating the unavailability of memory. In the current example, a bit in Bitmap 1 is set to "1" if all bits in the corresponding LLB Segment are set.

Figure 4:
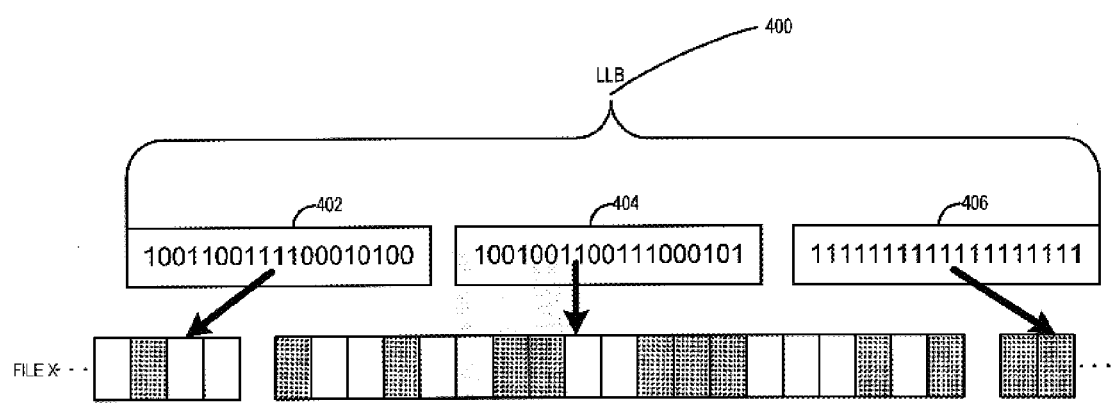
FIG. 4 is a diagram illustrating the definition of the Lowest Level Bitmap.

FIG. 4 is a diagram illustrating the definition of the Lowest Level Bitmap. This LLB 400 is divided into Segments 402, 404, and 406 that each includes an arbitrary, predetermined number of bits. In this example, each of the Segments includes nineteen bits. In other embodiments, the Segments could be adapted to the specific machine architecture. For example, the Segments could be created to include thirty-two or sixty-four bits to correspond to the word size of the system. In an implementation in which each Segment is a word in length, a partial Segment occurring at the trailing edge of the LLB can be bit-filled to create a word-sized Segment. The added bits are set to a state indicating the unavailability of the associated (virtual) Sections. That is, the extra bits that are added to create a Segment of the requisite length do not correspond to actual memory Sections. This implementation may make search routines easier to implement since the Segments may be readily manipulated using the word-oriented instructions of the machine instruction set of the data processing system. In yet other embodiments, the Segments of the LLB need not all be of the same size. This will be discussed further below.

In this example, Segment 406 describes nineteen Memory Sections that are all in use, as indicated by the fact that every bit in this bitmap Segment is set. Some of the Memory Sections described by bitmap Segments 402 and 404 are available for use, as indicated by the fact that some of the bits in these bitmap Segments are cleared.

Figure 5:
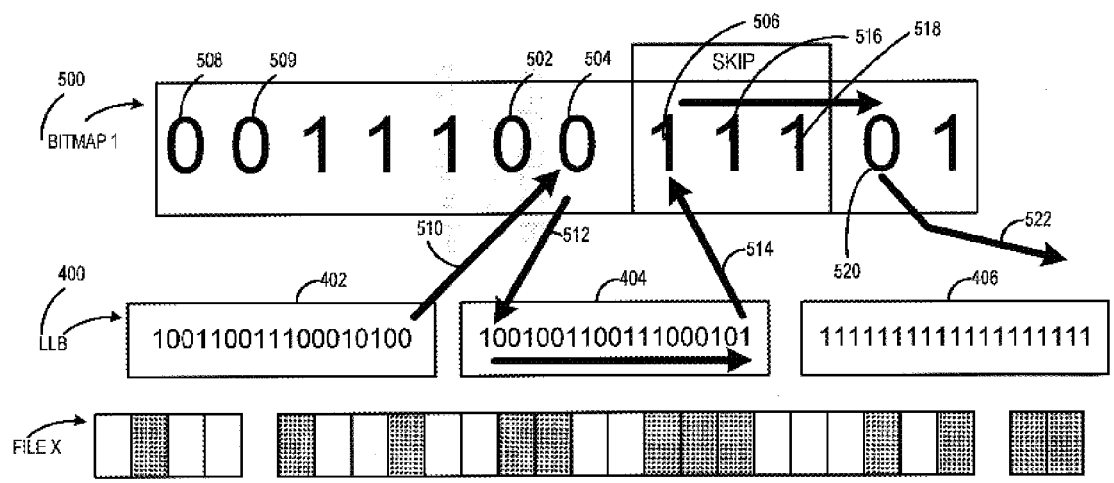
FIG. 5 is a diagram illustrating the use of a hierarchical bitmap definition.

FIG. 5 is a diagram illustrating the use of a hierarchical bitmap definition. Hierarchical Bitmap 1 500 is defined to describe LLB 400 in a manner that is similar to the way LLB 400 describes the Sections of File X. That is, a bit included within Bitmap 1 500 is set if all bits in the corresponding LLB Segment are set, and is cleared if any bits in the corresponding LLB Segment is cleared. This is illustrated by bits 502, 504, and 506 of Bitmap 1. Cleared bits 502 and 504 correspond to Segments 402 and 404 of FIG. 4, respectively, which describe portions of File X having memory Sections available for allocation. Bit 506, which is shown set, corresponds to Segment 406 of LLB 400, in which all bits are set, and which corresponds to a portion of File X in which all Sections are already in use.

Hierarchical Bitmap 1 500 may be used to shorten the time required to perform a search for an available portion of a File of a predetermined size. This can be accomplished since the Segments of the LLB that describe File Sections that are all in use as indicated by Bitmap 1 500 do not have to be searched on a bit-by-bit basis. This is best illustrated by example.

Assume that a search is being conducted to allocate memory for a buffer that is four contiguous Sections of Memory in length. This buffer is to be implemented within the predetermined File X. To find the available memory, a bitmap search is initiated on the hierarchical bitmap definition of File X as shown in FIG. 5. This search will begin at a predetermined edge of the LLB 400, which in the current example will be the left edge. The first bitmap Segment of the LLB, which is the Segment corresponding to bit 508 of Bitmap 1, and which is not illustrated in FIG. 5, will be searched. The search process will be initiated at the predetermined edge of this LLB Segment, which in this case is the left edge. The bit-by-bit search will continue through this Segment until the desired four contiguous available memory sections are located, or until the right edge of the Segment is reached.

If the edge of the Segment is reached without locating the desired memory, the search proceeds to the next higher level in the HBS, which is Bitmap 1 500. The next bit to process at this level is bit 509 in the current example, which corresponds to the next LLB Segment that is to be processed. Since this bit is cleared, indicating the availability of memory, the search continues with the next Segment of the LLB.

Assume that four contiguous available Sections of memory are not located, and the search proceeds to bit 502 of Bitmap 1. This bit is in the cleared state, and the search continues with the corresponding LLB Segment 402. Again, the right edge of this Segment is reached without locating the desired memory. Therefore the search proceeds from the LLB to Bit 504 of Bitmap 1 500 as exemplified by Arrow 510. The state of this bit again indicates the availability of some corresponding memory sections, and the search returns to corresponding Segment 404 of the LLB as indicated by Arrow 512. The search of this Segment is unsuccessful in that four contiguous cleared bits are not located. Processing continues with Bit 506 of Bitmap 1, as illustrated by Arrow 514. This bit is set, indicating that no search need be performed on corresponding LLB Segment 406. Bits 516 and 518 are also set, and the corresponding LLB Segments (not shown) are also not searched. The next LLB Segment to be searched will correspond to Bit 520, as indicated by Arrow 522.

The above example shows that by skipping portions of the LLB that are not associated with available memory, the search is completed more efficiently. The search will terminate when the desired memory is located, or when the edge of any of the levels in the HBS is reached without locating the memory.

Bitmap 1 of the current example has fewer bits than the LLB by a factor of nineteen. While this will reduce the search time, the search may still be prohibitively long if a File includes a large number of Sections. Therefore, additional hierarchical levels within the bitmap may be created in the manner described above. That is, Bitmap 1 may be subdivided into Segments. In some embodiments, each of the Segments includes a same predetermined number of bits, although in some implementations this is not a prerequisite, as will be discussed below.

Figure 6:
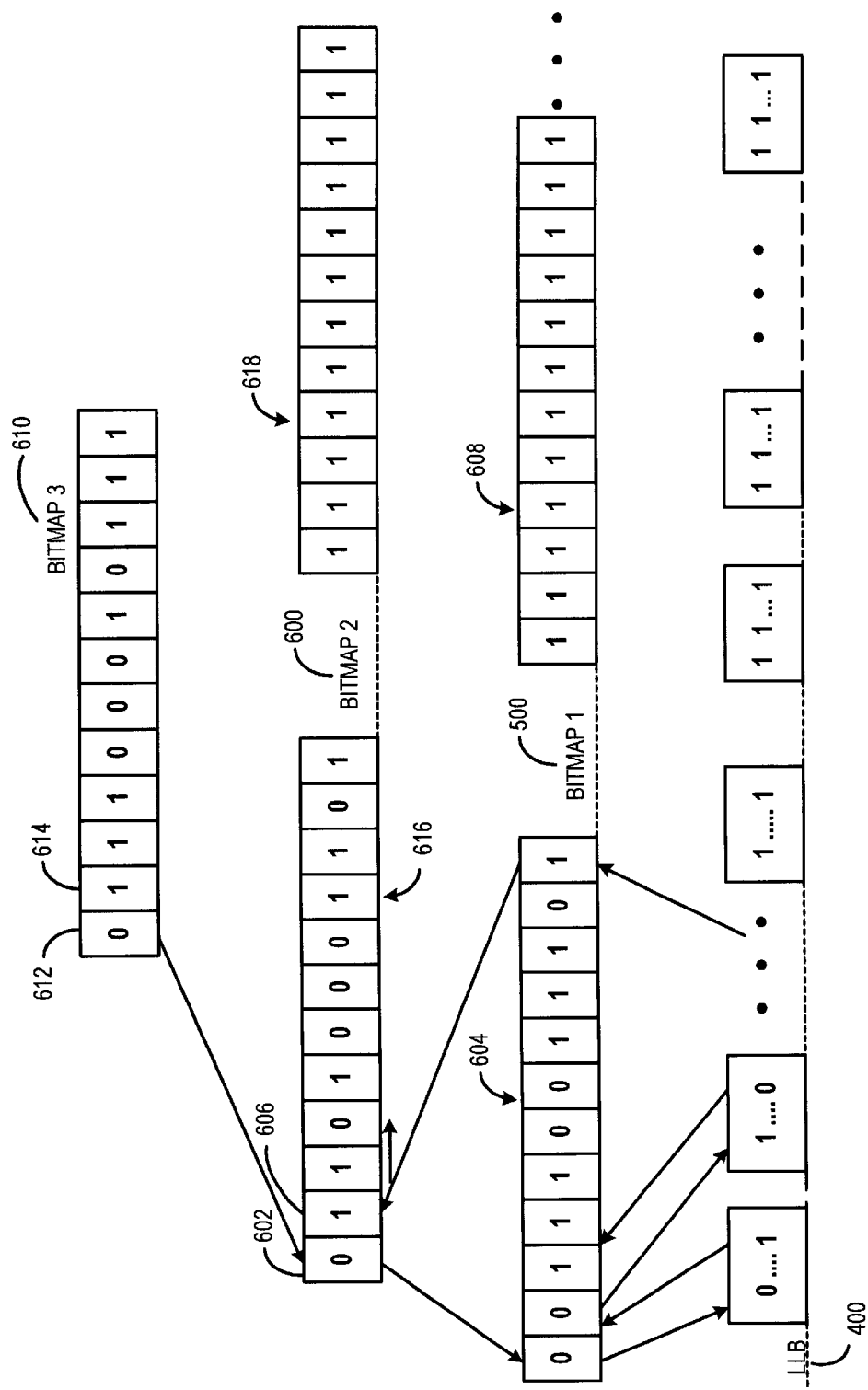
FIG. 6 is a diagram illustrating the definition of two additional levels of the bitmap hierarchy.

FIG. 6 is a diagram illustrating the definition of two additional levels of the bitmap hierarchy. Bitmap 2 600 includes a bitmap wherein each bit describes a Segment of Bitmap 1 500 in the manner discussed above. For example, bit 602 described Bitmap 1 Segment 604, whereas bit 606 describes Bitmap 1 Segment 608. Likewise, Bitmap 3 610 is a bitmap having bits that each describe a Segment of Bitmap 2 600, with bit 612 describing Bitmap 2 Segment 616, and bit 614 describing Bitmap 2 Segment 618. Any number of levels of the hierarchical bitmap may be defined.

Figure 7:
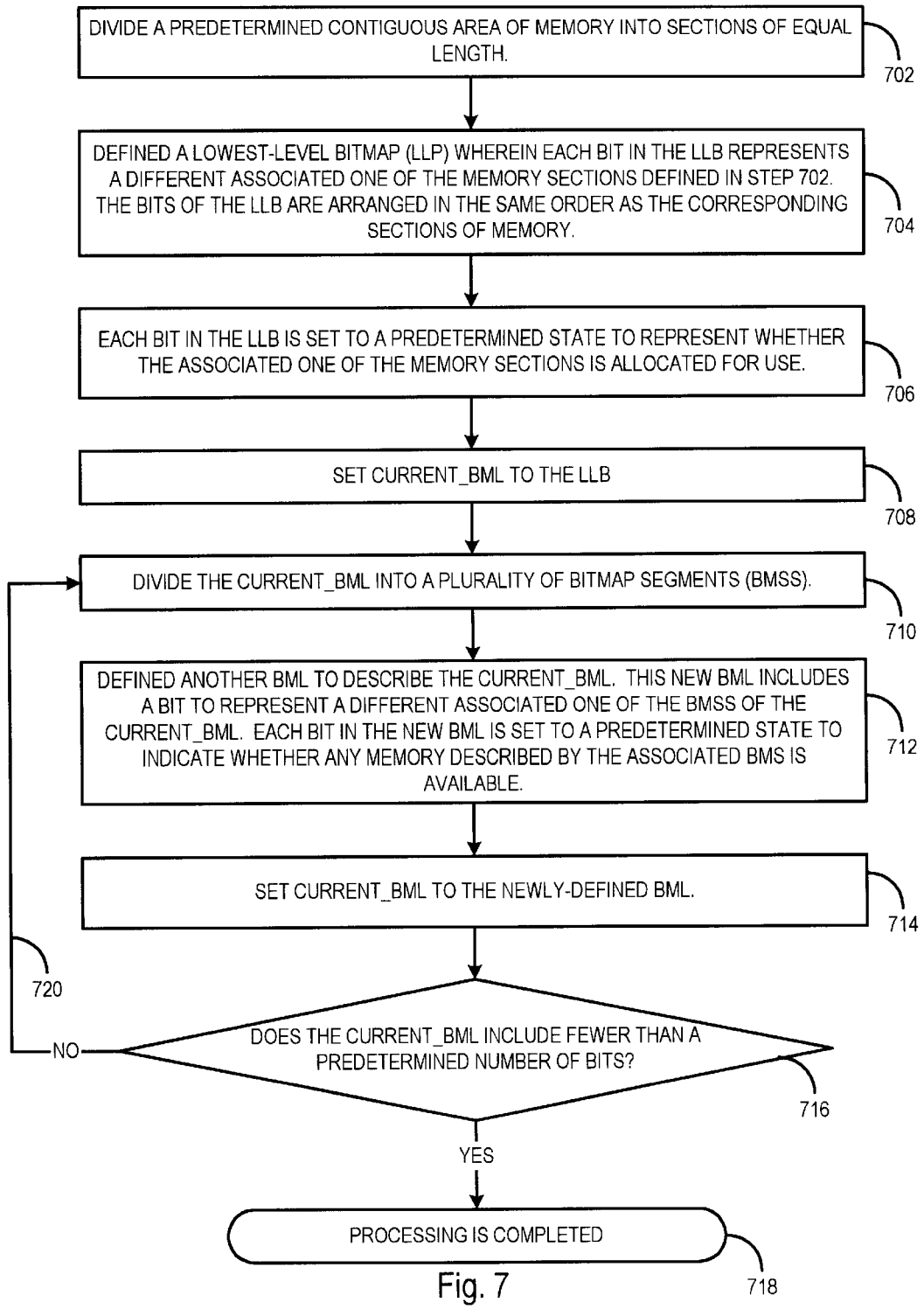
FIG. 7 is a flowchart illustrating the process used to define a Hierarchical Bitmap Structure (HBS) such as the one described above.

FIG. 7 is a flowchart illustrating the process used to define a Hierarchical Bitmap Structure (HBS) such as the one described above. In Step 702, a predetermined area of storage within either a main memory such as Memory 102 or Mass Storage Device 114 is divided into Sections that are each of a predetermined length. In Step 704, a Lowest-Level Bitmap (LLB) is defined wherein each bit in the LLB represents a different associated one of the memory sections. The bits in the LLB are arranged in an order indicative of the order of the corresponding memory sections. In Step 706, each of the bits in the LLB is set to a predetermined state indicative of whether or not the corresponding memory Section is allocated. In Step 708, the Current BitMap Level (Current_BML) is set to the LLB.

Processing next continues with Step 710, in which the Current_BML is divided into a plurality of BitMap Segments (BMSs). In one embodiment, all BMSs within the same BML include the same number of bits, although this is not a requirement in some implementations, as will be discussed further below. In Step 712, another BML is defined to represent the Current_BML. The newly-defined BML includes a bit that represents a different associated one of the BMSs of the Current_BML. Each bit in the newly-defined BML is set to a state based on the states of the bits in the associated one of the BMSs. In the current embodiment, a bit is cleared within the newly-defined BML if any bit in the associated one of the BMSs is cleared, and is set if all bits in the associated one of the BMSs is set. In Step 714, the Current_BML is set to the newly-defined BML. In Step 716, it is determined whether the Current_BML includes fewer than a predetermined number of bits. If this condition is met, the definition process is completed, as shown by Step 718. Otherwise, the process is continued with Step 710, as illustrated by Arrow 720. Thus, the process continues until the highest level BML is as small as is desired by the user. In the preferred embodiment, the definition process is considered complete when the highest level BML is small enough to fit within one addressable storage location of the memory.

Several search mechanisms may be employed to utilize the HBS that is defined using the process of FIG. 7. In either instance, the HBS may be used to locate an available storage Segment of a predetermined length in a manner that is more efficient that performing a bit-by-bit search of a conventional bitmap data structure.

Figure 8A:
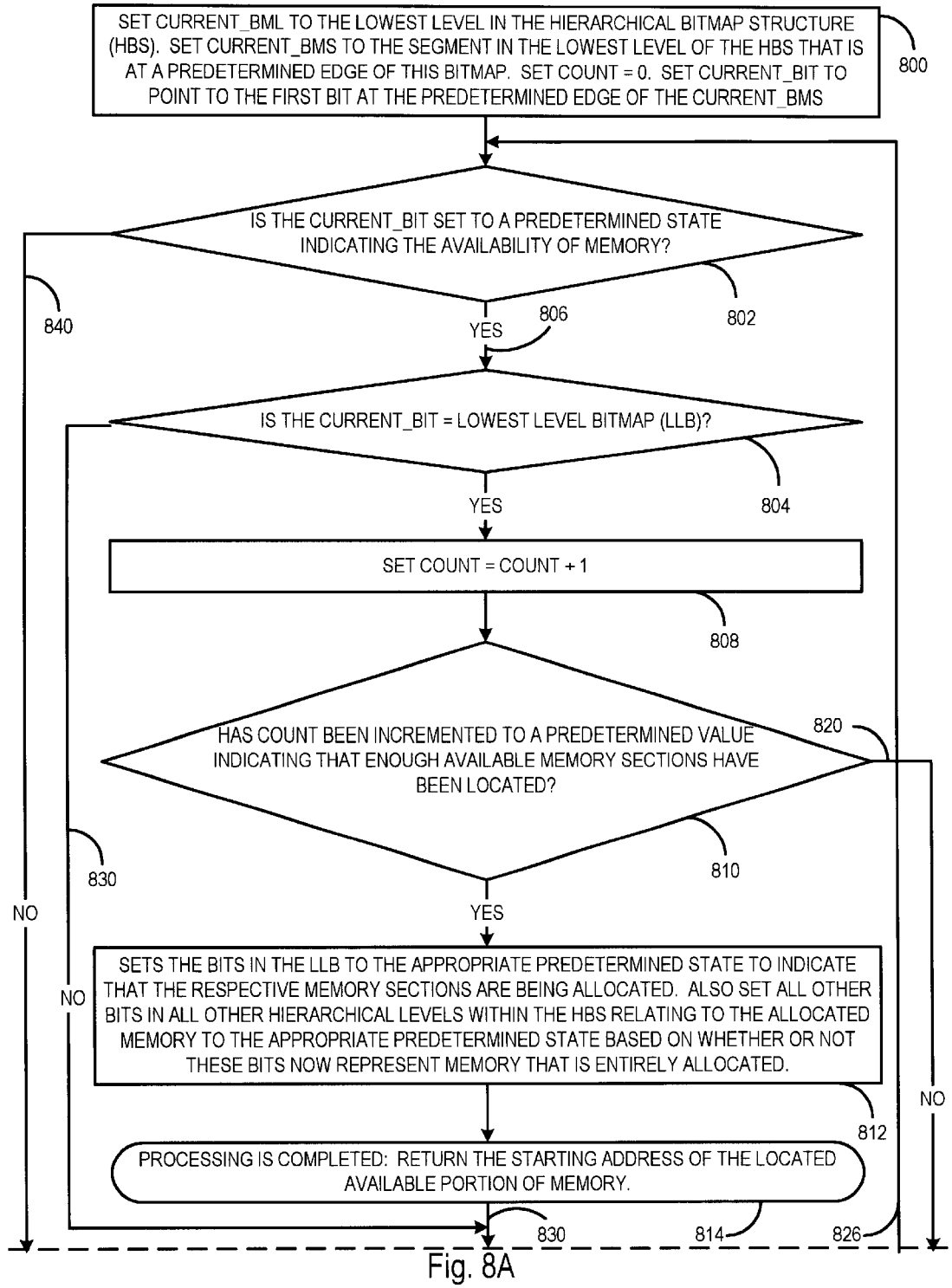
FIGS. 8A through 8D, when arranged as shown in FIG. 8, are a flowchart illustrating the preferred method of utilizing the HBS to perform a search for an available memory portion having a predetermined length.
Figure 8B:
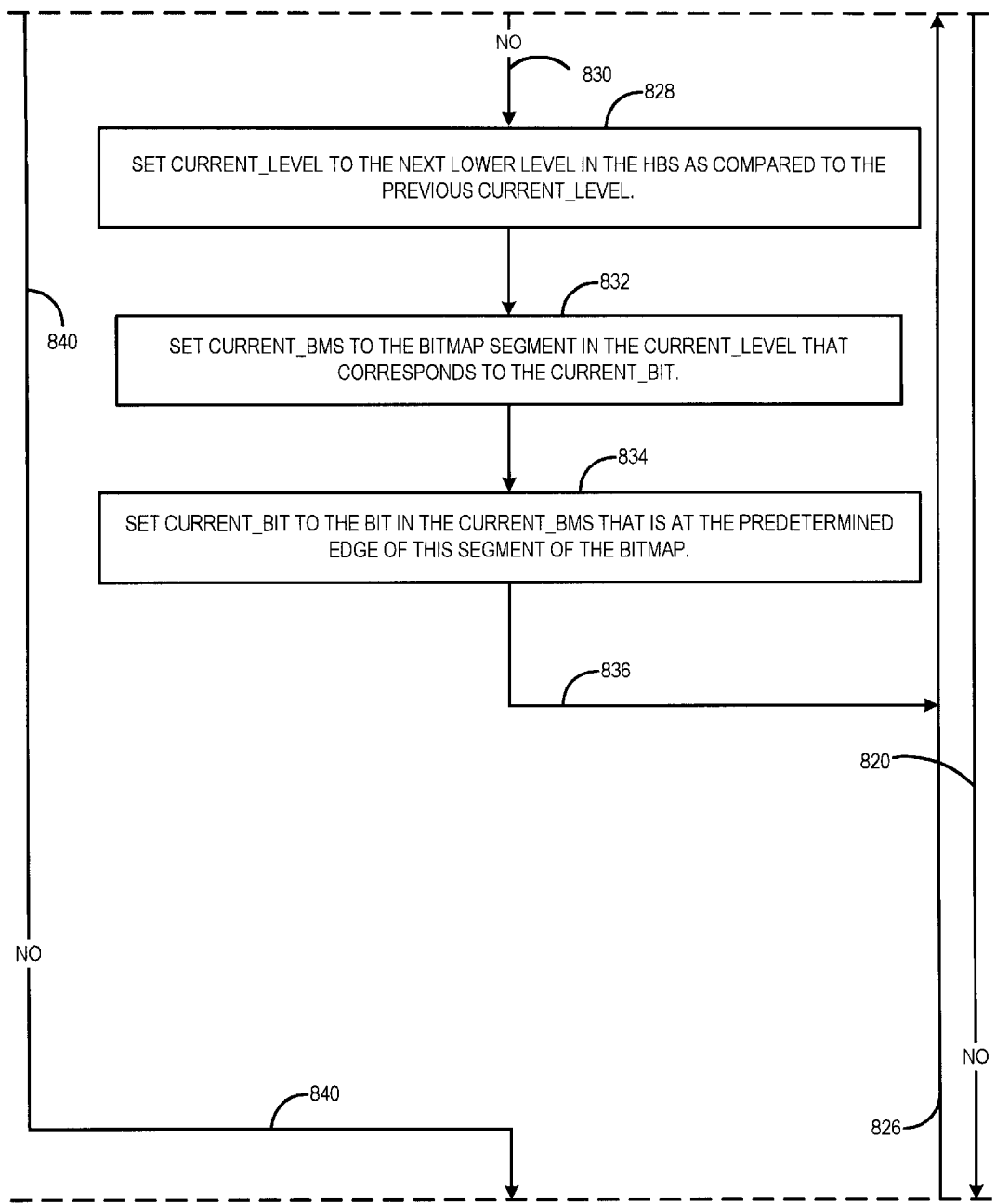
Figure 8C:
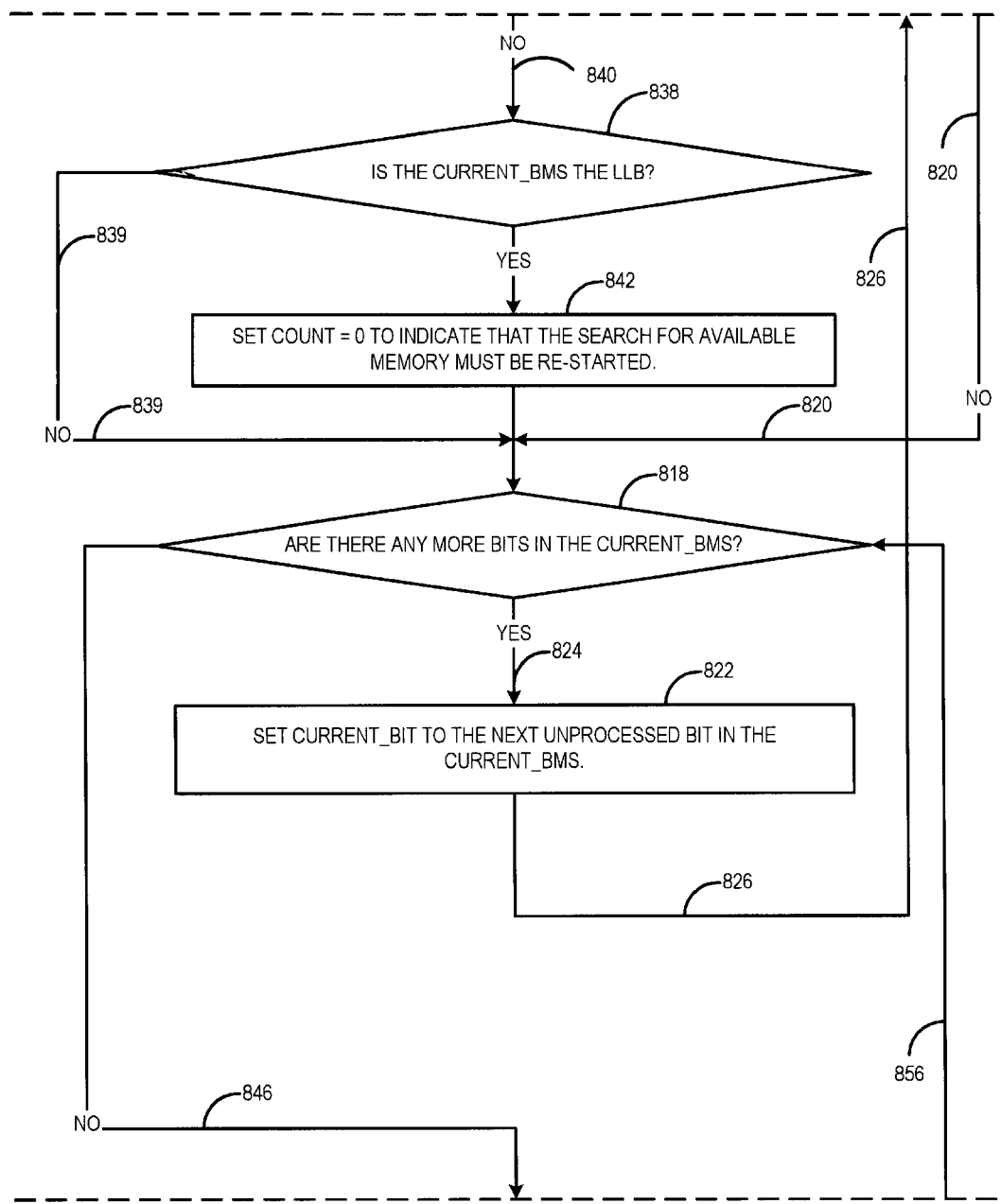
Figures 8, 8D:
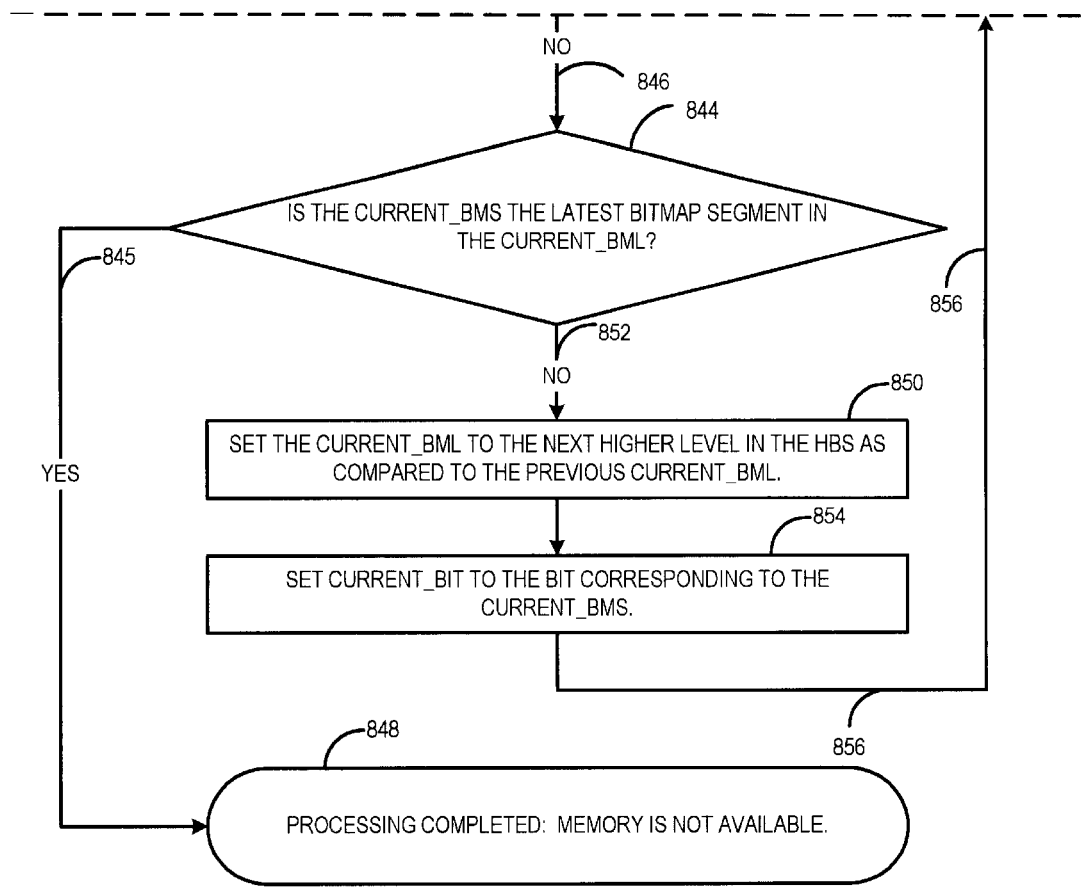

FIGS. 8A through 8D, when arranged as shown in FIG. 8, are a flowchart illustrating the preferred method of utilizing the HBS to perform a search for an available storage buffer having a predetermined length. This process does not require that the Segments at all levels in the HBS represent portions of storage of equal length. That is, so long as the bits at the LLB each represent predetermined portions of storage of equal length, the Segments of the Bitmaps at any of the other levels in HBS may be of varying lengths.

The process of FIG. 8 uses the mechanism described above with respect to FIG. 6. That is, the search begins at one edge within the Lowest-Level Bitmap (LLB) in the HBS. Whenever a bit in the LLB is located that indicates the availability of memory, a count value is incremented to record the presence of the located memory. The search completes successfully when the count value is incremented to reflect that a predetermined number of contiguous available memory Sections have been located. If, during this search, a bit in the LLB is located indicating the unavailability of the corresponding memory Section, the count value is reset such that the search for a predetermined number of contiguous memory sections must be re-started.

At the end of each Segment search, whether at the LLB or another higher level in the HBS, the search proceeds to the bit in the next higher level in the HBS that corresponds to the next Segment to search in the previous (lower) level. If this bit at the next higher BML is not located within the same Segment as the Segment most-recently processed within that next higher BML, the search must again proceed to the next higher level in the bitmap. As the search proceeds at any level other than the LLB, a bit indicating the availability of memory causes the search to continue within the corresponding bitmap Segment residing at the next lower level in the HBS. A bit indicating the unavailability of memory is skipped such that the search proceeds at the then current bitmap level.

The process of FIG. 8 begins at Step 800, wherein the LLB is made the Current BitMap Level (Current_BML). The BitMap Segment at a predetermined edge of the LLB is made the Current BitMap Segment (Current_BMS), and the bit at the predetermined edge of the Current_BMS is made the Current_Bit. A count value "Count" is set to 0. This count value will be used to record the number of contiguous available memory Segments that are located during the search.

Next, processing continues at Step 802. If the Current_Bit is set to a predetermined state indicating the availability of portions of the memory associated with that Current_Bit, processing continues at Step 804, as indicated by Arrow 806. In Step 804, it is determined whether the Current_BML is the LLB. If it is, the value stored in variable "Count" is incremented by one, indicating that an available section of memory has been located. This is shown in Step 808. Next, it is determined whether the Count has reached a predetermined value indicating the requisite amount of available memory has been located, as shown by Step 810. If Count is set to this predetermined value, the bits in the LLB which resulted in the Count incrementation are set to the predetermined state to represent that the corresponding memory Sections have been allocated. Additionally, all other bits at any level in the HBS associated with the allocated memory must be set to an appropriate state to indicate whether these bits correspond to a memory portion that has been completely allocated. This is shown in Step 812. In Step 814, processing is completed, and the memory address associated with the located available memory sections may be returned to the requester.

If the Count has not reached the predetermined value in Step 810, processing continues with Step 818 (FIG. 8C) as indicated by Arrow 820. In Step 818, it is determined whether there are any more bits in the Current_BMS. If there are, processing continues with Step 822, as indicated by Arrow 824. In Step 822, the Current_Bit is set to the next unprocessed bit in the Current_BMS, and processing continues with Step 802 (FIG. 8A) as indicated by Arrow 826.

Returning to Step 804 of FIG. 8A, if the Current_BML is not the LLB, processing continues with Step 828 (FIG. 8B), as indicated by Arrow 830. At Step 828, the Current_BML is set to the level in the HBS that is one level lower than the previous Current_BML. At Step 832, the Current_BMS is set to the bitmap Segment that corresponds to the Current_Bit, which is a bit within the next higher level of the HBS as compared to that specified by the Current_BML. Finally, the Current_Bit is set to the bit at the predetermined edge of the Current_BMS of the Current_BML, as indicated by Step 834. Processing continues with Step 802 (FIG. 8A), as indicated by Arrows 836 and 826.

Considering Step 802 again of FIG. 8A, if the Current_Bit is not set to the predetermined state indicating an availability of memory, processing continues with Step 838 (FIG. 8C), as shown by Arrow 840. In Step 838, it is determined whether the Current_BML is the LLB. If the Current_BML is not the LLB, processing continues with Step 818, as indicated by Arrow 839. Otherwise, the Count is set to 0 to indicate that any partially-completed search for an adequate storage area must be re-initiated, as illustrated by Step 842. In Step 818, it is determined whether any more bits are included in the Current_BMS. If more bits are available, the Current_Bit is set to the next bit in the Current_BMS, and processing continues at Step 802 (FIG. 8I), as shown by Step 822, and Arrow 826. Otherwise, if no more bits are included in the Current_BMS as determined by Step 818, processing is directed to Step 844 (FIG. 8D), as indicated by Arrow 846. In Step 844, it is determined whether the Current_BMS is the last remaining BitMap Segment at this BitMap Level. If it is, processing is completed without finding the requisite memory, as indicated by Arrow 845 and Step 848. Otherwise, processing is directed to Step 850, as shown by Arrow 852. In Step 850, the Current_BML is made the BML that is one higher in the HBS as compared to the previous Current_BML. In Step 854, the Current_Bit is set to the bit that represents the Current_BMS, (that is, that BitMap Segment for which processing was just completed) Then the Current_BMS is set to point to the Segment within the Current_BML that contains the Current_Bit. Next, processing continues with Step 818 (FIG. 8C), as indicated by Arrow 856.

FIG. 8 illustrates one process that may be utilized in conjunction with the HBS to locate a portion of memory of a predetermined size. Other methods may be utilized to process the data structure of the current invention.

Figure 9A:
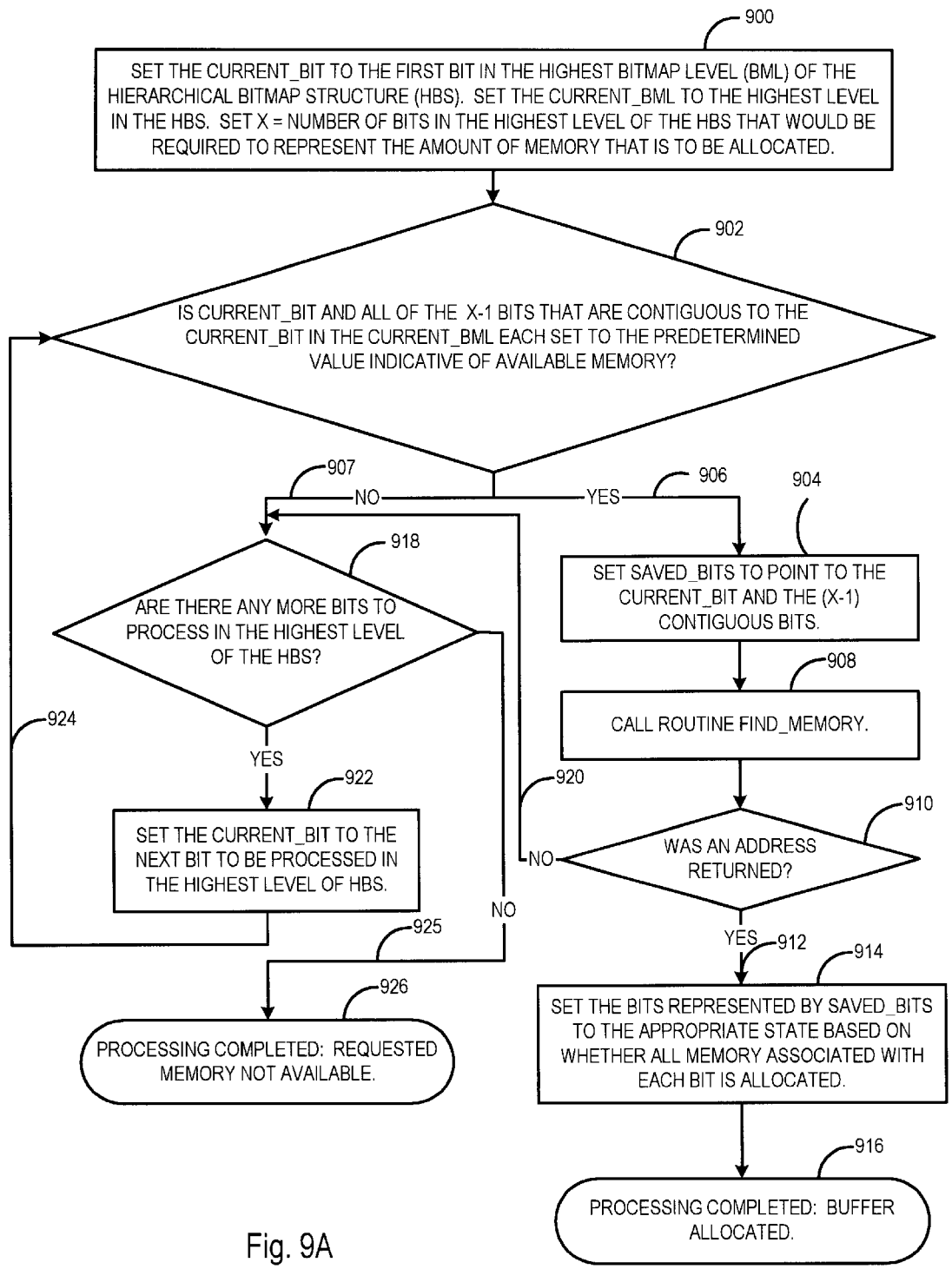
FIGS. 9A through 9D, when arranged as shown in FIG. 9, are a flowchart describing an alternative process that may be employed to search the HBS for a portion of memory of a predetermined size.
Figure 9B:
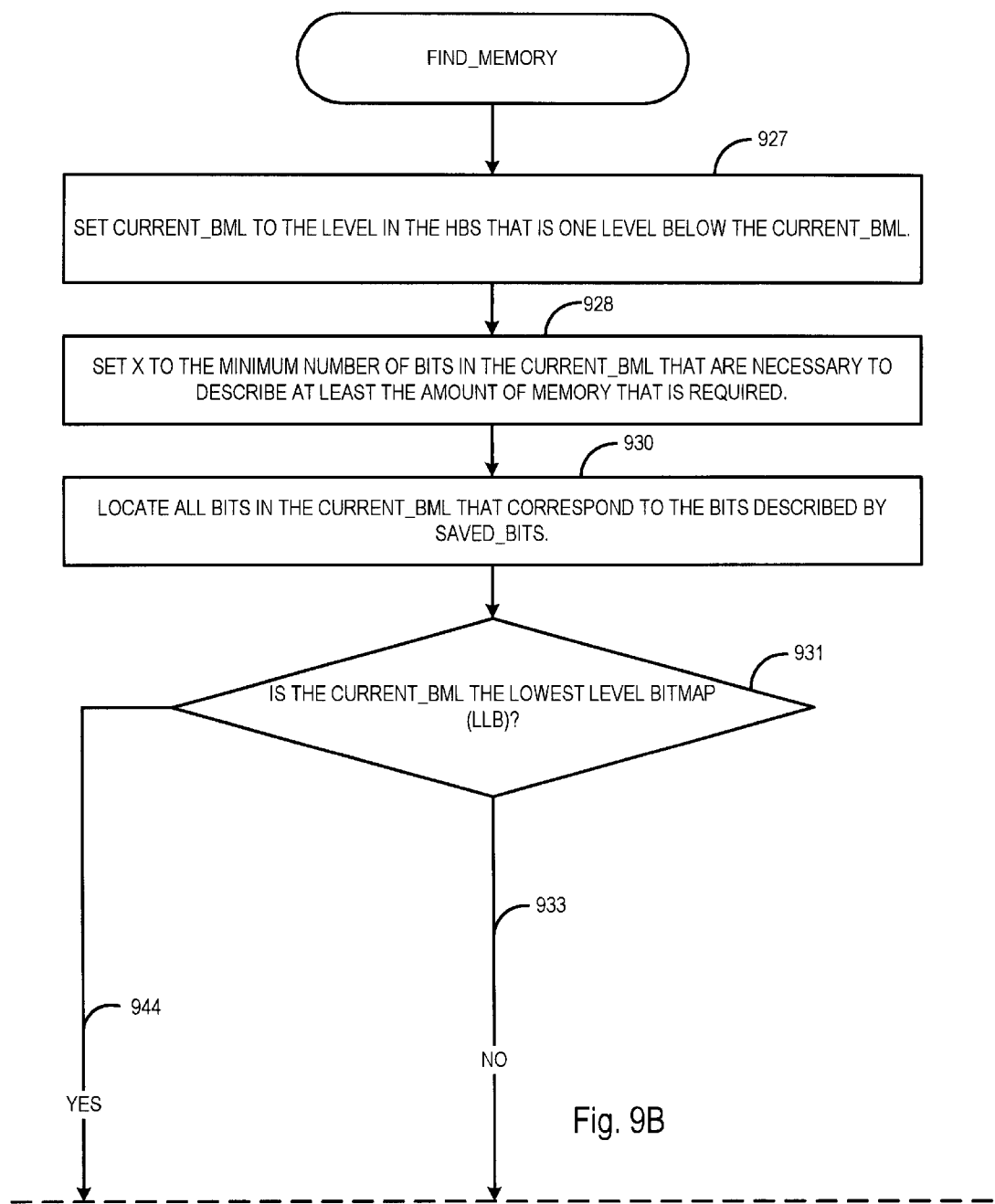
Figure 9C:
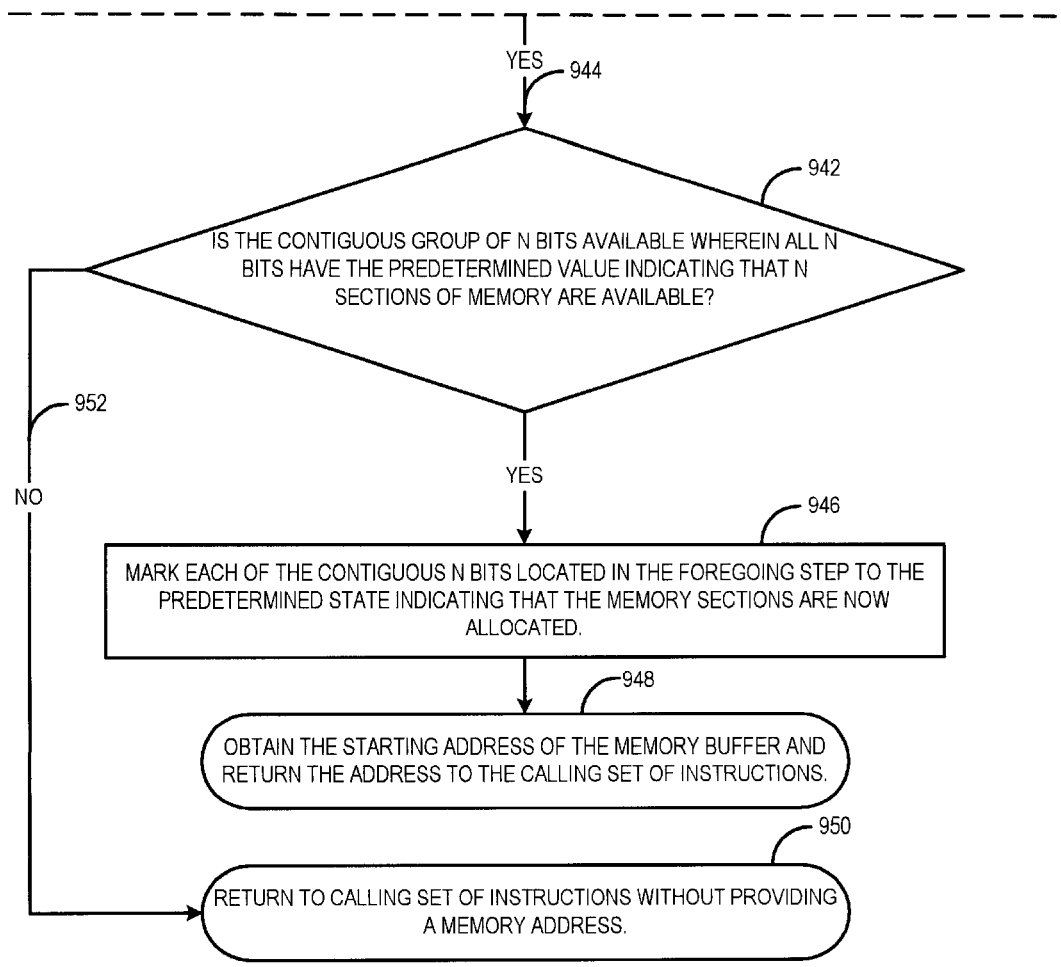
Figure 9:
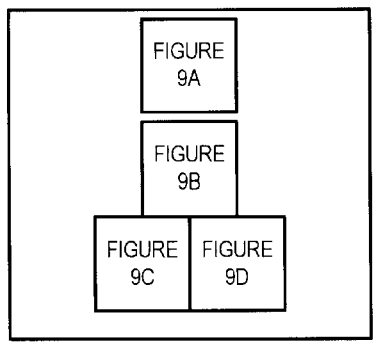

FIGS. 9A through 9D, when arranged as shown in FIG. 9, are a flowchart describing an alternative process that may be employed to search the HBS for a portion of memory of a predetermined size. According to this search mechanism, each Segment within a particular BML must be the same size as all other Segments such that all Segments in a particular BML represents the same number of search items. For example, each Segment of Bitmap 2 600 must include the same number of bits as the other Segments of Bitmap 2, each Segment of Bitmap 1 500 must include the same number of bits as all other Segments of Bitmap 1, and so on.

The alternative search mechanism for N contiguous available memory sections is shown in detail in FIG. 9. The search starts at one edge of the highest level in the HBS. The search looks for as many contiguous bits in the predetermined state as are required to satisfy the buffer requirements. In other words, assume each bit at the highest level represents one-half megabytes of memory. The desired buffer is 750,000 bytes. The search therefore looks for two consecutive bits that are in the state which indicates the presence of available memory. When these bits are found, the search proceeds to the next lower lever in the hierarchy. All bits at this lower level that correspond to the previously-located bits are searched to determine if any combination of consecutive ones of these corresponding bits indicate the possibility of an available buffer of the necessary size. For each located combination of bits, the search proceeds to the next lower level in a recursive manner. If no combination of bits is located, the search proceeds once again by incrementing the current bit number and continuing at the highest level in the HBS. The steps of this search are shown in detail in FIG. 9.

The process of FIG. 9 begins in Step 900, which involves initialization of variables. The Current_BML is set to the highest level in the HBS. The variable "X" is set to the number of bits in the highest level of the HBS that represents the amount of memory desired for allocation. The Current_Bit is set to a bit at a predetermined edge in the highest level of the HBS. Processing continues to Step 902, wherein it is determined whether the Current_Bit and all (X−1) bits next to the Current_Bit in the Current_BML are each set to the predetermined value indicating available memory. If this is the case, processing continues to Step 904, as indicated by Arrow 906. The variable Saved_Bits is set to indicate the Current_Bit and the (X−1) bits next to the Current_Bit, wherein the variable Saved_Bits is local to the current recursion level. Routine Find_Memory is then called in Step 908. Upon returning from this routine, it is determined whether a buffer address is returned. If it is, as indicated by Arrow 912, Step 914 is executed. In this Step, each of the bits represented by Saved_Bits is set to a predetermined state to indicate whether or not all memory described by that bit has been allocated. (Recall that a bit within a BML other than the LLB will represent multiple memory sections, all of which may not have been allocated during the call to Find_Memory, as will be discussed below.) Then the process is considered completed, as shown in Step 916.

Returning to Step 910, if no address is returned after the call to Find_Memory, execution proceeds to Step 918, as shown by Arrow 920. In this Step it is determined whether there are any more bits to process within the highest level of the HBS. If so, the Current_Bit is incremented to describe the bit that is adjacent to the previous Current_Bit. This is illustrated by Step 922. Execution continues with Step 902, as indicated by Arrow 924. If no additional bits remain in the highest level of the HBS, processing is completed without locating the desired available memory. This is shown by Arrow 925 and Step 926.

Returning again to Step 902, if the Current_Bit and all (X−1) bits next to the Current_Bit in the Current_BML are not each set to the predetermined value indicating available memory, processing continues to Step 918, as shown by Arrow 907. From Step 918 processing proceeds in the manner discussed above.

Figure 9D:
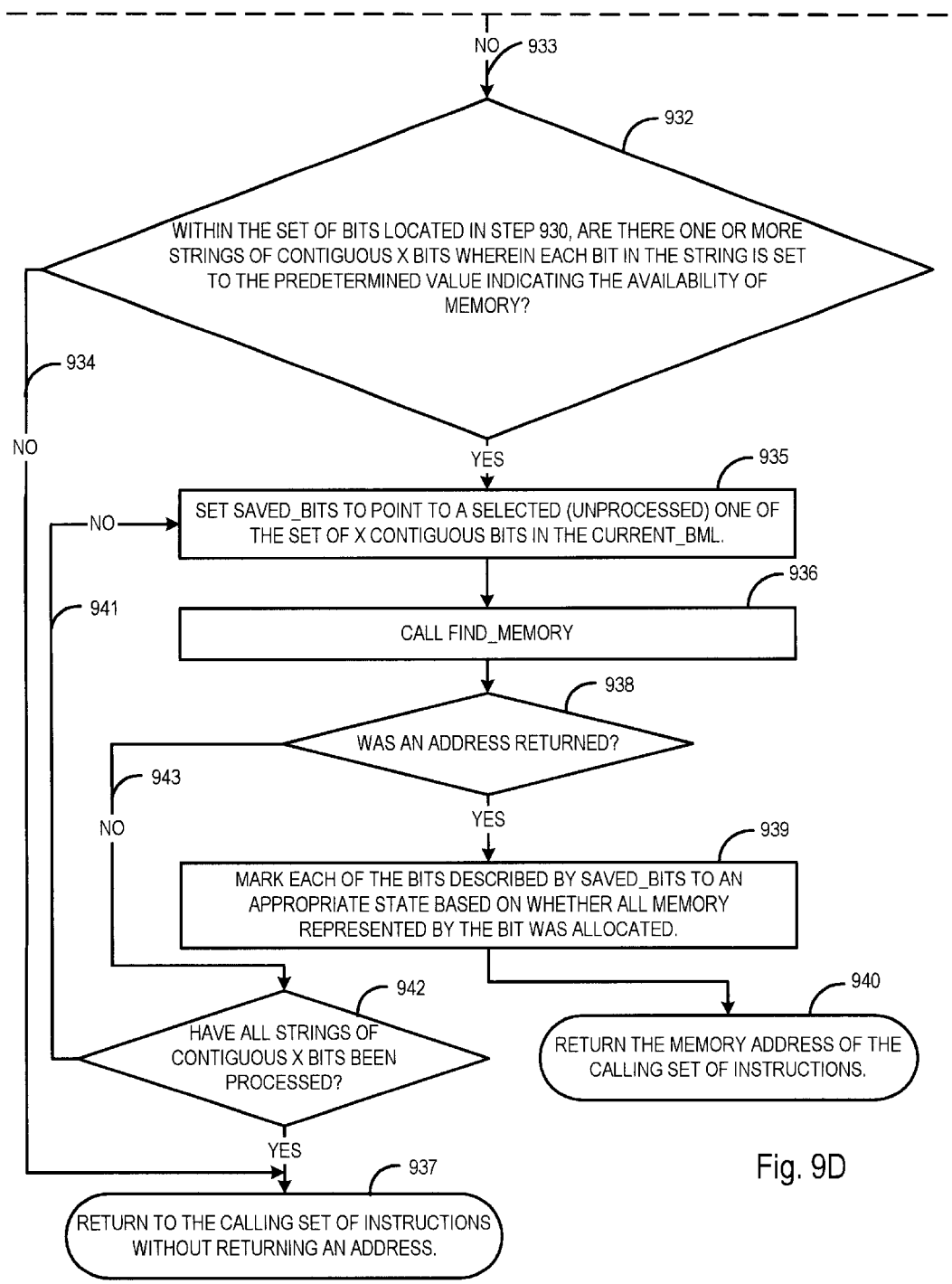

FIGS. 9B through 9D illustrate the Steps included in Routine Find_Memory. In Step 927, the Current_BML is set to one level lower than the previous Current_BML. Next, variable "X" is set to the minimum number of bits in the Current_BML that are necessary to describe the amount of memory being requested, as shown in Step 928. All Segments in the Current_BML that correspond to the bits represented by Saved_Bits of the previous Current_BML are located, as illustrated in Step 930. All bits in these located Segments are considered the current set of bits. Step 931 determines whether the Current_BML is the lowest level in the HBS. If it is not, execution continues with Step 932 (FIG. 9D) as indicated by Arrow 933.

In Step 932, it is determined whether within the current set of bits located in Step 930 there exists a contiguous string of N bits wherein each bit in the string is set to the predetermined state indicating available memory. If no such string is located, processing is completed, and a return to the calling set of instructions is executed. This is indicated by Step 937 and Arrow 934. If such a string is located, processing continues with Step 935. In Step 935, a description of a selected one of the contiguous located strings of bits is saved in Saved_Bits. In Step 936, the routine Find_Memory is called recursively. If an address is returned indicating that the desired available memory had been located, each of the bits in the Current_BML that corresponds to a bit described by Saved_Bits must be set to an appropriate state. This state indicates whether or not the bit corresponds to memory that has been entirely allocated. This is illustrated by Steps 938 and 939, respectively. Then the memory address which was returned by Find_Memory is returned to the calling set of instructions, as shown in Step 940.

If an address is not returned by Find_Memory, processing continues with Step 942, as shown by Arrow 943. If any additional strings of bits located in Step 932 remain to be processed, execution proceeds to Step 935, as indicated by Arrow 941. If all strings of bits have been processed without locating an available Segment of memory of the desired length, a return to the calling set of instructions is executed, as shown in Step 937.

Returning now to decision Step 931 (FIG. 9B), if the current BML is the LLB, processing proceeds to Step 942

(FIG. 9C), as indicated by Arrow 944. In this Step, a determination is made as to whether a contiguous group of N bits is set to the predetermined state indicating available memory. If so, the bits are set to the state indicating the memory is now unavailable, as illustrated by Step 946. The address of the memory buffer corresponding to the located bits is returned to the calling set of instructions, as indicated by Step 948. Otherwise, if no set of bits may be located indicating the availability of the desired memory, a return to the calling set of instructions is executed as indicated by Step 950 and Arrow 952.

The processes of FIGS. 8 and 9 provide two alternative mechanisms for utilizing the HBS to allocate memory. The process actually selected for use may depend on the number of levels in the HBS, the size of memory typically being allocated, and the manner in which memory is allocated. Based on these factors one mechanism may provide more efficient search results than the other mechanism.

Figure 10:
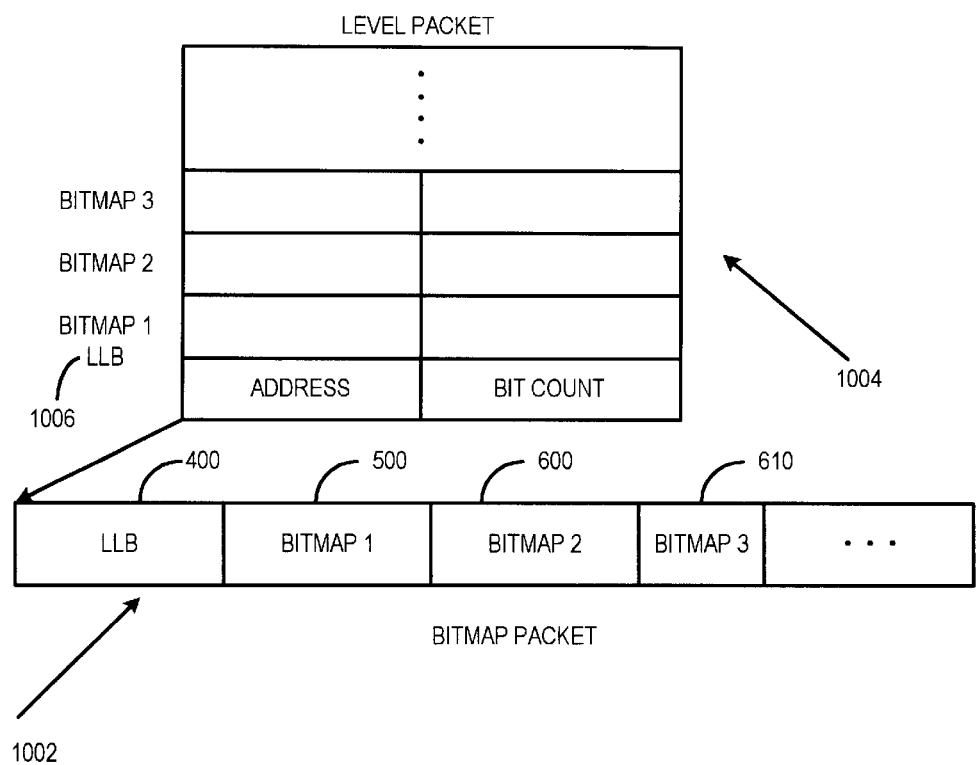
FIG. 10 is a block diagram of a data structure that may be used to store the Hierarchical Bitmap Structure of the current invention.

FIG. 10 is a block diagram of a data structure that may be used to store the Hierarchical Bitmap Structure of the current invention. This illustrated data structure is exemplary in nature only, and many other types of data structures could be used to implement the hierarchical bitmap structure of the current system. This data structure may be stored in a File Control Structure in a predetermined location in memory, such as that shown as File A Control Structure 214 (FIG. 2) located within Memory 102. A first portion of this Control Structure includes the bitmap itself This portion is shown as Bitmap Packet 1002 of FIG. 10. This Bitmap Packet includes a concatenation of all bitmaps discussed above, including the LLB 400, Bitmap 1 500 (FIG. 5), and Bitmap 2 600 and Bitmap 3 610 (FIG. 6). Another portion of this Control Structure includes a Level Packet 1004. This Level Packet includes a level descriptor for each of the individual bitmaps in the Bitmap Packet 1002. This level descriptor includes information such as the starting address and bit-length of the corresponding bitmap. This level descriptor may also include information such as the size of each of the Segments if all Segments are not of a predetermined size.

In the current example, Level Descriptor 1006 for the LLB bitmap includes a starting memory address and the bit-length of the LLB portion of Bitmap Packet 1002. The Level Packet may be used by the various methods described above to access the HBS embodied within the Bitmap Packet 1002.

Although the above description discusses the HBS as being employed by an Application Program to allocate memory, it will be understood that such a process could be employed by any memory management facility, including a memory management process running within an Operating System. Furthermore, this system and method is not limited to implementations wherein Sections of Files are being allocated, but may be used to manage any units of storage, and may be applied to allocation of both main memory areas or Segments of mass storage devices. Finally, although the implementation discussed above describes the invention in the context of a memory allocation system, this system may be adapted for use in locating any N contiguous search items wherein each of the N items is associated with a given desired attribute.

In view of the detailed descriptions and drawings, various modifications or implementations will become apparent to those skilled in the art without departing from the spirit and scope of the invention, and what is described to be protected by Letters Patent is set forth in the appended claims.

What is claimed is:

1. A computer-implemented method of managing the memory of a storage device by recording whether one or more predetermined sections of the memory are associated with a predetermined attribute, comprising the steps of:

(a) creating a first Lowest-Level Bitmap (LLB) containing multiple bits, each bit corresponding to a different associated one of the sections, each bit being set to a predetermined state depending on whether the different associated one of the sections is associated with the predetermined attribute, the multiple bits of the LLB being arranged in the order indicative of the order of the corresponding sections within the memory of the storage device;

(b) selecting the LLB as the lower-level bitmap;

(c) dividing the lower-level bitmap into segments, each segment including contiguous ones of the bits in the lower-level bitmap; and (d) creating a higher-level bitmap to define the lower-level bitmap, each bit in the higher-level bitmap being associated with a different respective one of the segments, and each bit in the higher-level bitmap being set to a predetermined state that describes the states of the bits in the different respective one of the segments of the lower-level bitmap.

2. The method of claim 1, and further comprising the steps of:

(e) making the higher-level bitmap the lower-level bitmap; and (f) repeating steps (c) and (d) until the higher-level bitmap has fewer than a predetermined number of bits.

3. The method of claim 2, wherein step (c) is performed such that each of the segments within the current bitmap has the same number of bits.

4. The method of claim 2, wherein the sections of memory are contiguously located sections of the same size, wherein the predetermined attribute is the availability of memory, and wherein step (a) includes the step of creating the LLB such that each of the bits describes whether a different associated one of the contiguous sections of the memory is available for allocation.

5. The method of claim 2, wherein step (d) is performed such that each bit in the higher-level bitmap is set to a predetermined state if any of the bits in the different respective one of the segments is set to the predetermined state.

6. A computer-implemented method of performing a search on a set of ordered items to locate N contiguous ones of the ordered items having a predetermined attribute wherein N is a positive integer, the set of ordered items being described by a Hierarchical Bitmap Structure (HBS), the HBS having multiple hierarchical levels including a Lowest-Level Bitmap (LLB), wherein the LLB is an ordered bitmap having a bit associated with a different respective one of the ordered items, wherein the state of each bit is indicative of whether the predetermined attribute has been assigned to the associated different respective one of the ordered items, wherein each of the hierarchical levels is divided into predetermined BitMap segments (BMSs), wherein each of the hierarchical levels except the LLB includes an ordered bitmap wherein each bit of the bitmap is associated with a different respective one of the BMSs of the hierarchical level located at the next lower level in the HBS to indicate the collective state of the bits included in the different respective one of the BMSs, the method comprising the steps of:

(a) initializing a count value to a predetermined initialization value, and selecting as the search starting position a first predetermined edge of the first BMS of the LLB;

(b) locating the next bit to process by:
  (b1) obtaining the next bit in the BMS being processed if the edge of the BMS is not reached;
  (b2) traversing to the next higher level in the HBS if all bits of the BMS being processed have been processed to obtain the bit that is associated with the BMS, then locating the unprocessed bit adjacent to the obtained bit;
(c) processing the located bit by:
  (c1) incrementing the count value if the located bit is in a first predetermined state and the located bit is included in the LLB;
  (c2) traversing to the first predetermined edge of the BMS in the next lower level in the HBS that is associated with the located bit if the located bit is not included in the LLB and is in the first predetermined state;
  (c3) resetting the count value to the predetermined initialization value if the located bit is in a second predetermined state and is included in the LLB;
(d) repeating steps (b) and (c) until all bits in any hierarchical level have been processed, or until the count value has been incremented to N.

7. The method of claim 6, and further including the step of (e) locating the ones of the ordered items that are respectively associated with the bits in the LLB that resulted in the incrementation of the count value to the predetermined value.

8. The method of claim 7, wherein the located ordered items are ordered, contiguous sections of storage within a data processing system and step (e) includes the step of obtaining the starting address of the N contiguous sections to be used to allocate the ordered contiguous sections of storage.

9. The method of claim 8, wherein the predetermined attribute indicates that the corresponding section is available for allocation, wherein the state of the respectively associated bit in the LLB is set to the first predetermined state to indicate that a respectively associated section is available for allocation, and further including the step (f) of setting each of the bits in the LLB that resulted in the incrementation of the count value to the second predetermined state.

10. The method of claim 9, wherein the state of any bit in any level in the HBS except the LLB is in the second predetermined state if all bits in the respectively associated BMS are in the second predetermined state, and is in the first predetermined state if any bits in the respectively associated BMS is in the first predetermined state, and further including the step of adjusting the states of all bits in the HBS accordingly to reflect the setting of bits to the second predetermined state in step (f).

11. A method of allocating storage space within a data processing system using a Hierarchical Bitmap Structure (HBS) that records the allocation of sections of the storage space, the HBS having multiple hierarchical BitMap Levels (BMLs) wherein each BML is an ordered bitmap divided into BitMap segments (BMSs), wherein each BML except the Lowest-Level Bitmap (LLB) that resides at the lowest level in the hierarchy includes bits each set to a predetermined state indicative of the collective states of all of the bits included in a different respectively associated one of the BMSs of the BML at the next lower level in the hierarchy, and wherein the order of the bits of each BML is indicative of the order of the BMSs of the BML at the next lower level in the hierarchy, and wherein the LLB includes bits each set to a state indicative of whether a different respectively associated one of the sections has been allocated, and wherein the order of the bits in the LLB is indicative of a order of the sections within the storage space, the method comprising the steps of:
(a) initializing a count value to zero and selecting for processing as the current bit a first bit included in the BMS at a predetermined edge of a predetermined one of the BMLs;
(b) processing the current bit using the following steps:
  (b1) incrementing the count value if the current bit is in a first predetermined state and the current bit is located in the LLB;
  (b2) locating the BMS in the next lower level of the HBS that is respectively associated with the current bit if the current bit is in the first predetermined state and the current bit is not located in the LLB;
  (b3) setting the count value to zero if the current bit is in a second predetermined state and the current bit is located in the LLB;
(c) locating the next bit to process as the current bit if the count value has not reached a predetermined count or if there is not any BML in which all bits have been processed, wherein locating step (c) includes the following steps:
  (c1) getting the next unprocessed bit in the BMS being processed if any such bit exists;
  (c2) locating the bit in the next higher BML that is respectively associated with the BMS currently being processed if no unprocessed bits remain in the current BMS;
(d) repeating steps (b) and (c) until the count value has been incremented to a predetermined count or until all bits within any of the BMLs have been processed; and
(e) allocating the sections of the storage device that correspond to the respectively associated bits in the LLB that resulted in incrementation of the count value.

12. The method of claim 11, and further including the step (f) of setting the respectively associated bits in the LLB that resulted in incrementation of the count value to the second predetermined state to indicate that the respectively associated sections are now allocated.

13. The method of claim 12, wherein each bit in each BML except the LLB is set to the second predetermined state if all bits in the respectively associated BMS at the next lower level in HBS are set to the second predetermined state, and is set to the first predetermined state if any of the bits in the respectively associated BMS at the next lower level in HBS are set to the first predetermined state, and further including the step (g) of setting each bit in the HBS to the appropriate state based on the setting of bits to the second predetermined state in step (f).

14. The method of claim 11, wherein step (a) includes the step of selecting for processing as the current bit a first bit included in the BMS at a predetermined edge of the LLB.

15. The method of claim 11, wherein step (a) includes the step of selecting for processing as the current bit a first bit included in the BMS at a predetermined edge of the highest BML in the HBS.

16. A computer-implemented method of performing a search on a set of ordered items, the search being performed for N contiguous ones of the ordered items having a predetermined attribute, the set of ordered items being described by a Hierarchical Bitmap Structure (HBS), the HBS having multiple hierarchical levels including a Lowest-Level Bitmap (LLB), wherein the LLB is an ordered bitmap having a bit associated with a different respective one of the ordered items wherein the state of the bit is indicative of whether the predetermined attribute has been assigned to the different respective ones of the ordered items, wherein each of the hierarchical levels is divided into predetermined BitMap segments (BMSs), wherein each of the hierarchical levels except the LLB includes an ordered bitmap wherein each bit of the bitmap is associated with a different respective one of the BMSs of the hierarchical level located at the next lower level in the HBS to indicate the collective state of the bits included in the different respective one of the BMSs, the method comprising the steps of:

(a) Setting a count value to zero, selecting the highest hierarchical level in the HBS as the current level, and selecting as the current bits the set of bits at the current level required to describe N contiguous ones of the ordered items;

(b) Processing the current set of bits using the following steps if the current set of bits is not located in the LLB; and (b1) Locating, for each of the bits in the current set of bits, the respectively associated BMS at the next lower level in the HBS;

(b2) Determining the number of bits X in the next lower level in the HBS that are respectively associated with N contiguous ones of the ordered items;

(b3) Locating all sets of X contiguous bits in the set of bits included in the BMSs located in step (b1) wherein all of the X contiguous bits have a first predetermined state indicative of a predetermined attribute; and (b4) Making each set of bits located in step (b3) the current set of bits and processing the current set of bits according to steps (b) and (c);

(c) Processing the current set of bits using the following steps if the current set of bits is located in the LLB;

(c1) Locating, within the current set of bits, any string of N contiguous bits in the first predetermined state; and (c2) Locating the N contiguous ones of the ordered items respectively associated with the string of bits located in step (c1).

17. The method of claim 16, wherein the located ordered items are ordered, contiguous sections of memory included within a data processing system, and step (e) includes the step of obtaining the starting address of the N contiguous sections for use in allocating the contiguous sections of memory.

18. The method of claim 17, wherein the predetermined attribute indicates whether the corresponding section of memory is available for allocation, wherein the state of the respectively associated bit in the LLB is set to the first predetermined state to indicate that the respectively associated section is available for allocation, and further including the step (f) of setting each of the bits in the LLB that resulted in the incrementation of the count value to the second predetermined state indicating the sections located in step (c2) are no longer available for allocation.

19. The method of claim 18, wherein the state of any bit in any level in the HBS except the LLB is in the second predetermined state if all bits in the respectively associated BMS is in the second predetermined state, and is in the first predetermined state if any bits in the respectively associated BMS is in the first predetermined state, and further including the step of adjusting the states of all bits in the HBS accordingly to reflect the setting of bits to the second predetermined state in step (f).

20. A system for cataloging and locating an attribute associated with an ordered set of search items, comprising:

first storage means for storing a Lowest Level Bitmap (LLB) including data signals describing predetermined ones of the search items, the first storage means being partitioned into segments;

second storage means for storing multiple hierarchical BitMap Levels (BMLs) each being partitioned into segments, a first one of the BMLs for describing the segments of the first storage means, and each of the other BMLs for describing the segments of the BML that is located at the next lower level in the hierarchy.

21. The system of claim 20, wherein the first storage means includes means for storing as the LLB a respectively associated data signal for each of the predetermined ones of the search items, each data signal being set to a predetermined state to indicate whether the attribute is associated with the respectively associated predetermined one of the search items.

22. The system of claim 21, wherein the second storage means includes means for storing, as the first one of the BMLs, a bitmap including a different respectively associated data signal for each of the segments of the first storage means indicative of the collective state of the data signals within the segment.

23. The system of claim 22, wherein the second storage means includes means for storing as each of the other BMLs except the first one of the BMLs a bitmap including a different respectively associated data signal for each of the segments of the BML that is located at the next lower level in the hierarchy, the state of each data signal being indicative of the collective state of the respectively associated segment.

24. The system of claim 23, and further including search means for utilizing the first and second storage means for locating a contiguous number of N data signals within the LLB that are set to a predetermined state, wherein N is a positive integer.

25. The system of claim 24, wherein the search means includes (a) first means for processing a bit within the LLB that is set to a first predetermined state by incrementing a running count of located search items;

(b) second means for processing a bit within the LLB that is set to a second predetermined state by re-initializing a running count of located search items back to a predetermined initialization value;

(c) third means for processing a bit within any BML except the first BML that is set to a first predetermined state by finding a predetermined bit in the respectively associated segment that resides within the BML at the next lower level in the hierarchy to process;

(d) fourth means for processing a bit within the first BML that is set to a first predetermined state by finding a predetermined bit in the respectively associated segment of the LLB to process; and (e) fifth means for processing a bit that is within any BML except the BML at the highest level in the hierarchy and that is set to the second predetermined state by finding a predetermined bit in the next higher level in the hierarchy to process.

26. The system of claim 25, and further including sixth means for terminating processing when the running count of located search items is incremented to N, for terminating processing when a predetermined bit in any of the BMLs is processed, and for terminating processing when a predetermined bit in the LLB is processed.

27. A system for tracking attributes of items, wherein the items are arranged in a predetermined order, comprising:

first storage means for storing a first bitmap having first fields each set to a state that describes one or more attributes of an associated one of the items;

second storage means for storing a second bitmap having at least one second field set to a state that provides information regarding the states of associated ones of the first fields;

third storage means for storing one or more additional bitmaps, each of the additional bitmaps including at least one field set to a state that provides information regarding the states of associated ones of the fields included within a different associated one of the bitmaps that is selected from a group of bitmaps consisting of the second bitmap and the one or more additional bitmaps;

wherein the first storage means, the second storage means, and the third storage means each includes means for storing each of the first fields, the second fields, and the fields of the one or more additional bitmaps, respectively, in an order determined by the predetermined order; and search means for utilizing the first, second, and third storage means to locate a predetermined number of contiguous items having a predetermined attribute, the search means including:

a.) means for locating the predetermined number of contiguous first fields that are set to a state indicating the predetermined attribute and that are associated with a same second field;

b.) means for making the first bitmap the current bitmap; and c.) means for locating within the group of bitmaps a higher-level bitmap having a field describing the state of associated ones of the fields in current bitmap;

for locating a next higher-level bitmap having a field describing the state of associated ones of the fields in the higher-level bitmap; and for determining whether there are multiple contiguous fields in the higher-level bitmap that are associated with a same field of the next higher-level bitmap and that are further associated with the predetermined number of contiguous first fields that are set to the state indicating the predetermined attribute.

28. The systems of claim 27, and further including:

d.) means for designating the higher-level bitmap as the current bitmap, for designating the next higher-level bitmap as the higher-level bitmap, for designating, as the next higher-level bitmap, a bitmap within the group of bitmaps that has a field describing a state of associated ones of the higher-level bitmap, and for re-invoking means c.); and e.) means for re-invoking means d.) and e.) until the predetermined number of contiguous first fields are located, or until there is no bitmap to designate as the next higher-level bitmap.

* * * * *